United States Patent
Sager

(10) Patent No.: US 10,296,968 B2
(45) Date of Patent: May 21, 2019

(54) WEBSITE AUGMENTATION INCLUDING CONVERSION OF REGIONAL CONTENT

(71) Applicant: United Parcel Service of America, Inc., Atlanta, GA (US)

(72) Inventor: Jeffrey Carl Sager, Dallastown, PA (US)

(73) Assignee: United Parcel Service of America, Inc., Atlanta, GA (US)

( * ) Notice: Subject to any disclaimer, the term of this patent is extended or adjusted under 35 U.S.C. 154(b) by 327 days.

(21) Appl. No.: 13/736,659

(22) Filed: Jan. 8, 2013

(65) Prior Publication Data
US 2014/0164902 A1    Jun. 12, 2014

Related U.S. Application Data

(60) Provisional application No. 61/734,689, filed on Dec. 7, 2012.

(51) Int. Cl.
*G06F 17/00*    (2006.01)
*G06Q 30/06*    (2012.01)
(Continued)

(52) U.S. Cl.
CPC ......... *G06Q 30/0641* (2013.01); *G06F 9/454* (2018.02); *G06F 17/211* (2013.01);
(Continued)

(58) Field of Classification Search
CPC ............ G06Q 30/0261; G06Q 30/0601; G06F 17/30867; G06F 17/218; G06F 17/289; G06F 17/20; G06F 17/3089
(Continued)

(56) References Cited

U.S. PATENT DOCUMENTS 4,383,306 A    5/1983    Morimoto et al.
4,713,761 A    12/1987   Sharpe et al.
(Continued)

FOREIGN PATENT DOCUMENTS

| CA | 2309634 A1 | 6/1998 |
| WO | WO 1996/008783 A1 | 3/1996 |
| WO | WO 1997/031322 A1 | 8/1997 |
| WO | WO 2012/115507 A1 | 8/2012 |

OTHER PUBLICATIONS

U.S. Appl. No. 61/612,397, filed Mar. 19, 2012.
(Continued)

*Primary Examiner* — Laurie A Ries
(74) *Attorney, Agent, or Firm* — Shook, Hardy & Bacon L.L.P.

(57) ABSTRACT

A computer system configured to integrate a plurality of websites is provided. The computer system includes a memory, a display, and at least one processor coupled to the memory and the display. In one example, the system comprises a monitoring component executed by the at least one processor and configured to analyze web content generated by a website provider and detect one or more identified elements within the web content. The system may also comprise a converting component executed by the at least one processor and configured to, responsive to detection of the one or more identified elements by the monitoring component, convert at least one portion of the web content into converted content, wherein the at least one processor is configured to display, in the display, the converted content and at least one other portion of the web content.

43 Claims, 13 Drawing Sheets

(51) Int. Cl.
    *G06F 17/21*     (2006.01)
    *G06F 17/30*     (2006.01)
    *H04L 29/08*     (2006.01)
    *G06F 9/451*     (2018.01)

(52) U.S. Cl.
    CPC .... *G06F 17/3089* (2013.01); *G06F 17/30893* (2013.01); *H04L 67/02* (2013.01); *H04L 67/18* (2013.01)

(58) Field of Classification Search
    USPC .................................. 715/201, 249, 267, 273
    See application file for complete search history.

(56) References Cited

U.S. PATENT DOCUMENTS

| | | | | |
|---|---|---|---|---|
| 4,766,293 | A | 8/1988 | Boston | |
| 4,799,156 | A | 1/1989 | Shavit et al. | |
| 4,926,368 | A | 5/1990 | Morita et al. | |
| 4,974,028 | A | 11/1990 | Enoguchi et al. | |
| 4,992,940 | A | 2/1991 | Dworkin | |
| 5,063,506 | A | 11/1991 | Brockwell et al. | |
| 5,077,804 | A | 12/1991 | Richard | |
| 5,128,862 | A | 7/1992 | Mueller | |
| 5,285,383 | A | 2/1994 | Lindsey et al. | |
| 5,319,542 | A | 7/1994 | King, Jr. et al. | |
| 5,335,169 | A | 8/1994 | Chong | |
| 5,351,189 | A | 9/1994 | Doi et al. | |
| 5,420,405 | A | 5/1995 | Chasek | |
| 5,557,780 | A | 9/1996 | Edwards et al. | |
| 5,592,378 | A | 1/1997 | Cameron et al. | |
| 5,594,225 | A | 1/1997 | Botvin | |
| 5,630,125 | A | 5/1997 | Zellweger | |
| 5,631,827 | A | 5/1997 | Nicholls et al. | |
| 5,644,115 | A | 7/1997 | Knauer | |
| 5,644,721 | A | 7/1997 | Chung et al. | |
| 5,664,115 | A | 7/1997 | Knauer | |
| 5,664,721 | A | 7/1997 | Chung et al. | |
| 5,666,493 | A | 9/1997 | Wojcik et al. | |
| 5,671,279 | A | 9/1997 | Elgamal | |
| 5,694,551 | A | 12/1997 | Doyle et al. | |
| 5,710,887 | A | 1/1998 | Chelliah et al. | |
| 5,715,314 | A | 2/1998 | Payne et al. | |
| 5,717,989 | A | 2/1998 | Tozzoli et al. | |
| 5,721,832 | A | 2/1998 | Westrope et al. | |
| 5,758,328 | A | 5/1998 | Giovannoli | |
| 5,787,400 | A | 7/1998 | Weber | |
| 5,799,283 | A | 8/1998 | Francisco et al. | |
| 5,802,293 | A | 9/1998 | Van der Sijpt | |
| 5,812,668 | A | 9/1998 | Weber | |
| 5,839,088 | A * | 11/1998 | Hancock | G01C 21/20 342/457 |
| 5,842,178 | A | 11/1998 | Giovannoli | |
| 5,850,446 | A | 12/1998 | Berger et al. | |
| 5,870,473 | A | 2/1999 | Boesch et al. | |
| 5,870,717 | A | 2/1999 | Wiecha | |
| 5,875,433 | A | 2/1999 | Francisco et al. | |
| 5,889,863 | A | 3/1999 | Weber | |
| 5,890,130 | A | 3/1999 | Cox et al. | |
| 5,892,900 | A | 4/1999 | Ginter et al. | |
| 5,893,076 | A | 4/1999 | Hafner et al. | |
| 5,895,454 | A | 4/1999 | Harrington | |
| 5,897,621 | A | 4/1999 | Boesch et al. | |
| 5,897,622 | A | 4/1999 | Blinn et al. | |
| 5,910,896 | A | 6/1999 | Hahn-Carlson | |
| 5,910,987 | A | 6/1999 | Ginter et al. | |
| 5,960,200 | A | 9/1999 | Eager et al. | |
| 5,968,110 | A | 10/1999 | Westrope et al. | |
| 5,970,475 | A | 10/1999 | Barnes et al. | |
| 5,971,273 | A | 10/1999 | Vallaire | |
| 5,987,429 | A | 11/1999 | Maritzen et al. | |
| 5,991,394 | A | 11/1999 | Dezonno et al. | |
| 5,999,914 | A | 12/1999 | Blinn et al. | |
| 6,049,811 | A | 4/2000 | Petruzzi et al. | |
| 6,058,373 | A | 5/2000 | Blinn et al. | |
| 6,073,090 | A * | 6/2000 | Fortune | G06F 9/454 704/8 |
| 6,141,647 | A | 10/2000 | Meijer et al. | |
| 6,185,683 | B1 | 2/2001 | Ginter et al. | |
| 6,205,433 | B1 | 3/2001 | Boesch et al. | |
| 6,373,950 | B1 | 4/2002 | Rowney | |
| 6,460,020 | B1 * | 10/2002 | Pool et al. | 705/7.29 |
| 6,523,172 | B1 | 2/2003 | Martinez Guerra et al. | |
| 6,571,213 | B1 * | 5/2003 | Altendahl | G06Q 10/047 705/330 |
| 6,594,692 | B1 | 7/2003 | Reisman | |
| 6,623,529 | B1 | 9/2003 | Lakritz | |
| 6,964,014 | B1 * | 11/2005 | Parish | 715/205 |
| 7,441,184 | B2 * | 10/2008 | Frerebeau | G06F 9/4448 707/E17.006 |
| 7,904,333 | B1 * | 3/2011 | Perkowski | G06F 17/30879 705/14.4 |
| 7,904,595 | B2 * | 3/2011 | Cheng | G06F 17/3089 704/8 |
| 8,050,906 | B1 | 11/2011 | Zimmerman et al. | |
| 8,527,357 | B1 * | 9/2013 | Ganesan | G06Q 30/06 705/26.1 |
| 9,710,821 | B2 * | 7/2017 | Heath | G06Q 30/0222 |
| 9,857,177 | B1 * | 1/2018 | Gigliotti | G01C 21/00 |
| 2001/0055393 | A1 | 12/2001 | Sundaravel et al. | |
| 2002/0055924 | A1 * | 5/2002 | Liming | G01S 5/0027 |
| 2002/0112003 | A1 | 8/2002 | Glorikian | |
| 2002/0129064 | A1 | 9/2002 | Guthrie | |
| 2002/0156645 | A1 * | 10/2002 | Hansen | 705/1 |
| 2002/0174031 | A1 * | 11/2002 | Weiss | G06Q 20/04 705/26.1 |
| 2002/0174065 | A1 * | 11/2002 | Coward | 705/39 |
| 2002/0184308 | A1 | 12/2002 | Levy et al. | |
| 2003/0083889 | A1 | 5/2003 | Macklin | |
| 2003/0084401 | A1 * | 5/2003 | Abel et al. | 715/501.1 |
| 2003/0131316 | A1 * | 7/2003 | Brown | G06F 17/272 715/234 |
| 2004/0015408 | A1 * | 1/2004 | Rauen, IV | G06Q 10/10 705/26.41 |
| 2004/0047287 | A1 | 3/2004 | Tremblay et al. | |
| 2004/0186732 | A1 | 9/2004 | Okura | |
| 2004/0205118 | A1 * | 10/2004 | Yu | 709/203 |
| 2005/0102178 | A1 | 5/2005 | Phillips et al. | |
| 2006/0022048 | A1 * | 2/2006 | Johnson | G06F 17/3087 235/462.1 |
| 2006/0031436 | A1 | 2/2006 | Sakata et al. | |
| 2006/0136237 | A1 * | 6/2006 | Spiegel | G06Q 10/08 705/330 |
| 2006/0136309 | A1 * | 6/2006 | Horn | G06Q 10/087 705/26.8 |
| 2006/0287844 | A1 | 12/2006 | Rich | |
| 2007/0033520 | A1 | 2/2007 | Kimzey et al. | |
| 2007/0192468 | A1 | 8/2007 | Keeler | |
| 2008/0108370 | A1 | 5/2008 | Aninye | |
| 2008/0148383 | A1 | 6/2008 | Pitchaikani et al. | |
| 2008/0262828 | A1 | 10/2008 | Och et al. | |
| 2008/0275966 | A1 | 11/2008 | MacKinnon | |
| 2009/0092134 | A1 * | 4/2009 | Herrera Schuvab | 370/389 |
| 2009/0119091 | A1 | 5/2009 | Sarig | |
| 2009/0132230 | A1 | 5/2009 | Kanevsky | |
| 2009/0319257 | A1 | 12/2009 | Blume et al. | |
| 2009/0326914 | A1 | 12/2009 | Joy et al. | |
| 2010/0223048 | A1 | 9/2010 | Lauder | |
| 2011/0313874 | A1 * | 12/2011 | Hardie | H04W 4/02 705/26.1 |
| 2012/0016655 | A1 | 1/2012 | Travieso | |
| 2012/0137210 | A1 | 5/2012 | Dillon | |
| 2012/0323704 | A1 | 12/2012 | Steelberg et al. | |
| 2013/0036351 | A1 | 2/2013 | King et al. | |
| 2013/0262080 | A1 | 10/2013 | Marciano et al. | |
| 2013/0288633 | A1 | 10/2013 | Lemberg et al. | |
| 2013/0300562 | A1 * | 11/2013 | Krasinskiy et al. | 340/540 |
| 2014/0052593 | A1 | 2/2014 | Pool et al. | |
| 2014/0081619 | A1 * | 3/2014 | Solntseva | G06F 17/289 704/3 |
| 2014/0142917 | A1 | 5/2014 | D'Penha | |
| 2014/0214653 | A1 * | 7/2014 | Rose | G06Q 20/12 705/39 |

(56) References Cited

U.S. PATENT DOCUMENTS

| | | |
|---|---|---|
| 2014/0278342 A1 | 9/2014 | Shoshan |
| 2014/0317078 A1* | 10/2014 | Gallagher .......... G06F 17/30867 707/706 |
| 2014/0351277 A1 | 11/2014 | Rinne et al. |
| 2014/0351798 A1 | 11/2014 | Ross |
| 2014/0358736 A1 | 12/2014 | Sager |
| 2015/0120273 A1 | 4/2015 | Gusakov |
| 2015/0286632 A1 | 10/2015 | Meunier |
| 2016/0019205 A1* | 1/2016 | Kidwai ............... G06F 17/2836 704/7 |

OTHER PUBLICATIONS

"A Basic Guide to Exporting", Unz & Co., Inc. 1998 [Retrieved on Apr. 12, 2001] Retrieved from Internet <URL:http://www.unzco.com/basicguide/index.html>.

Cahn, What Benefits will Global EDI Offer?, Jun. 1992, Transmission & Distribution.

Del Busto, Charles, UCP 500 & 400 Compared, ICC Publishing (1993) iii-xvi, 1-134, see 99-100.

Google, "Translate" [online] [retrieved Aug. 18, 2014] Retrieved from the Internet <URL:https://translate.google.com/.

Oracle, "Class String Tokenizer" [online] [retrieved Aug. 18, 2014] retrieved from the Internet <URL:http:/Idocs.

Ramberg, Jan; Guide to Incoterms, International Commerical TERMS, (1990) 1-152, ICC Publishing (1991).

Schell, Ernest, Business 400: Not Just for Catalogs, Mar. 1991, Catalog Age, pp. 147-148.

United States Patent and Trademark Office, Office Action for U.S. Appl. No. 14/459,415, dated Jul. 15, 2016, 26 pages, U.S.A.

Non-Final Rejection dated Jun. 16, 2017 for U.S. Appl. No. 14/459,415.

United States Patent and Trademark Office, Office Action for U.S. Appl. No. 14/459,415, dated Jan. 27, 2017, 23 pages, U.S.A.

Final Rejection dated Jan. 27, 2017 for U.S. Appl. No. 14/459,415.

Non-Final Office Action received for U.S. Appl. No. 14/459,415, dated Mar. 28, 2018, 28 pages.

* cited by examiner

WEBSITE AUGMENTATION INCLUDING CONVERSION OF REGIONAL CONTENT

RELATED APPLICATIONS

This application claims priority under 35 U.S.C. § 119(e) to U.S. Provisional Application Ser. No. 61/734,689, entitled "SYSTEMS AND METHODS OF WEBSITE INTEGRATION," filed on Dec. 7, 2012, which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

Embodiments disclosed herein relate generally to integrating computer systems and, more particularly, to systems and processes of integrating websites.

Discussion

The internet provides a platform for a wide variety of organizations to interact with individuals around the globe. For example, Internet Retailers (IRs) provide online shopping websites allowing consumers to directly buy goods or services from a seller over the Internet. The IR websites can include product listings, including product descriptions and price and may further include other functions such as shopping cart functions and checkout functions. Shopping cart functions allow the consumer to temporarily save one or more products and to adjust quantities for purchase. Checkout functions provide methods of collecting payment and delivery information from the consumer.

Some organizations maintain websites that provide general informational about the organization to members of the public. Corporate websites may include a summary of company operations, history, and mission statement, as well as a "news" or "press" section containing press releases and news articles about the company. Investor pages may also be included with the annual report, business plan, current stock price, financial statements, overview of the company structure, SEC filing or other regulatory filings. The corporate website may also include a list of the company's products and services. An employment section may also be included listing open positions and describing procedures for applying to jobs. Contact information may be provided allowing visitors to submit questions and messages.

Websites such as those described above may include hyperlinks to other websites. These hyperlinks enable a browser interested in the content of the other website to quickly and conveniently navigate to it. Local webpages within these websites may also embed remote webpages from other websites to display content from the other websites in conjunction with content provided by the local webpages. However, even with these tools in hand, integrating these websites with one another is not a simple task.

SUMMARY

Some aspects disclosed herein provide systems and methods of providing integration services into existing websites without modifying the structure of the website. The integration services may integrate content, including both executable and non-executable content, and work seamlessly with the content presented by website providers to adapt the content provided on the websites to various users. In one implementation, the website provider includes an IR. The integration system monitors the IR's website and converts the IR's content to specific needs of the consumer. In one example, if the user is an international consumer shopping on a website standardized for a domestic consumer, the integration system converts the domestic website into a website matched to the needs of the international consumer. For example, the integration system converts product listings including domestic pricing into product listings having localized pricing. The integration system is further configured to convert domestic shipping calculation and fulfillment into international shipping calculation and fulfillment.

The integration system and method can vastly improve the online international consumer's buying experience. The incorporation of the integration services into the functions and content of the website provider is seamless, with the integration functions and content appearing to the end user as to be part of the services provided by the website provider. In an example implementation, the entire purchasing transaction is "owned" by the IR, without noticeably directing the consumer to third party websites or services and disrupting the consumer's shopping experience.

In some embodiments, the integration system and method is cloud-based and allows the website operator to present its value proposition to international shoppers and create a superior customer shopping experience without the expense and nuisance of building or implementing a custom platform. The integration system and method decreases the cost of integration and is easily integrated into the IR's website without significant overhead.

According to one aspect, a computer system comprising a memory, a display, and at least one processor coupled to the memory and the display is disclosed. In one example, the system comprises a monitoring component executed by the at least one processor and configured to analyze web content generated by a website provider and detect one or more identified elements within the web content. The system may also comprise a converting component executed by the at least one processor and configured to, responsive to detection of the one or more identified elements by the monitoring component, convert at least one portion of the web content into converted content, wherein the at least one processor is configured to display, in the display, the converted content and at least one other portion of the web content.

In various examples, the at least one portion of web content includes a representation of a first currency and the converted content includes a representation of a second currency different from the first currency. In the system, the web content can include a representation of a first parcel delivery service and the converted content includes a representation of a second parcel delivery service different from the first parcel delivery service.

In addition, the monitoring component can be further configured to detect geocoded indicators of a geolocation of the display. In one example, the converting component is further configured to convert the at least one portion of the web content into content configured for the geolocation. In some examples, the content configured for the geolocation includes an identifier of a parcel delivery service that services the geolocation. The content configured for the geolocation can include a representation of currency tenderable at the geolocation.

In one example, the content configured for the geolocation includes a representation of a welcome mat. The representation of the welcome mat can include at least one of an identifier of a language, an identifier of a currency, and an indicator of shipping preferences. In some examples, the indicator of shipping preferences includes an indicator of a preferred destination. The indicator of the preferred destination can include an indicator of at least one of an occupiable structure, a kiosk, and a locker.

In some examples, the one or more identified elements include text formatted as a first currency. In addition, the converted content can include text formatted as a second currency different from the first currency. In other examples, the converting component is further configured to convert the at least one portion of the web content to match a format and style of the web content of the website provider.

In at least one example, the monitoring component is further configured to detect executable content in the web content of the website provider and the converting component is further configured to reconfigure the at least one portion of the web content to execute at least one process in place of the executable content. The executable content can be configured to execute a transaction in a first currency and the process is configured to execute the transaction in a second currency different from the first currency.

In some examples, the converting component is configured to remove part of the at least one portion of the web content and replace the part with the converted content. The part can include an identifier of a first parcel delivery service and the converted content includes an identifier of a second parcel delivery service different from the first parcel delivery service. In other examples, the monitoring component is further configured to detect at least one action to change the geolocation associated with the display and the converting component is configured to convert the at least one portion of the web content into the converted content responsive to detection of the at least one action.

According to another aspect, a method of integrating content into content of a website provider using a computer system including a display is disclosed. In one example, the method comprises analyzing, by the computer system, web content generated by a website provider, detecting one or more identified elements within the web content, converting at least one portion of the web content into converted content, and displaying the converted content and at least one other portion of the web content in the display.

In some examples, the at least one portion of web content includes a representation of a first currency and converting the at least one portion of web content includes converting the representation of the first currency into a representation of a second currency different from the first currency. In other examples, the web content includes a representation of a first parcel delivery service and converting the at least one portion of web content includes generating a representation of a second parcel delivery service different from the first parcel delivery service.

In at least one example, the method further comprising detecting geocoded indicators of a geolocation of the display. In one example, the method further comprises converting the at least one portion of the web content into content configured for the geolocation. In the method, converting the at least one portion of web content can include identifying an identifier of a parcel delivery service that services to the geolocation. In one example, converting the at least one portion of web content includes generating a representation of currency tenderable at the geolocation. In another example, the method further comprises converting the at least one portion of the web content to match a format and style of the web content of the website provider.

In other examples, detecting the one or more identified elements includes detecting text formatted as a first currency. In the method, converting at least one portion of the web content includes converting the text formatted as a first currency into text formatted as a second currency different from the first currency.

According to another aspect, a computer readable medium storing instructions for integrating websites is disclosed. In one example, the instructions are executable by at least one processor of a computer system, the instructions instruct the computer system to analyze web content generated by a website provider, detect one or more identified elements within the web content, convert at least a portion of the web content into converted content, and display the converted content and at least one other portion of the web content in a display. Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, to not every component may be labeled in every figure. In the figures:

FIG. 7 is an illustration of a screen provided by an integration system according to one example;

FIG. 9 is an illustration of another screen provided by an integration system according to one example;

FIG. 12 is an illustration of another screen provided by an integration system according to one example; and FIG. 13 is an illustration of another screen provided by an integration system according to one example.

DETAILED DESCRIPTION

Figure 1:
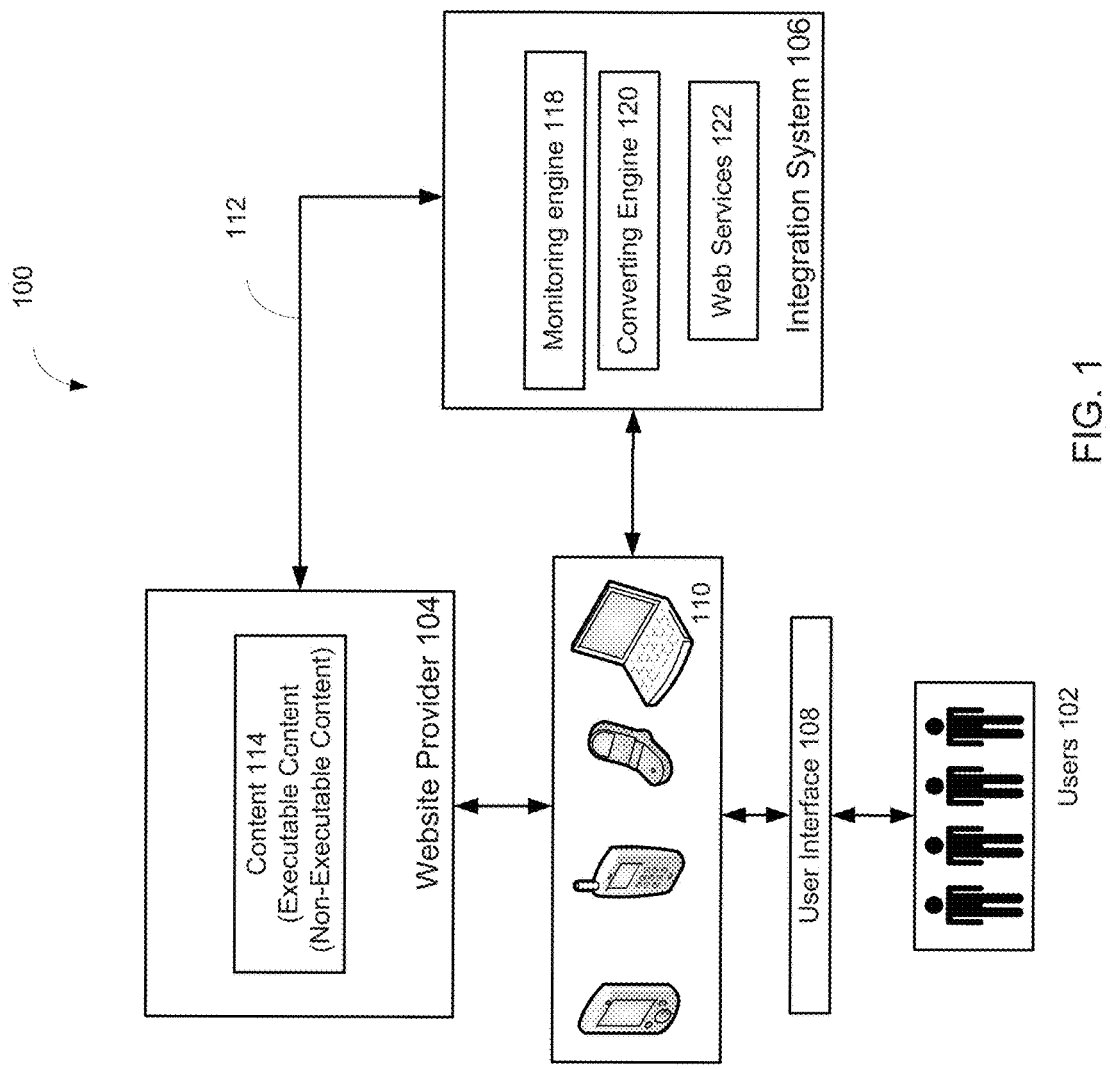
FIG. 1 is a schematic diagram of a distributed computing system including an integration system according to one example.

Some of the aspects and embodiments disclosed herein describe new systems and methods of integrating content into existing website structure. The systems and methods described herein analyze the website's default regional content and convert the detected content into user regional content. In some embodiments, this conversion process integrates information from distinct web-based components into a unified presentation for the user.

For instance, according to some embodiments, a computer system executes components that enable an IR to integrate an international payment and shipment web platform into the existing structure of a default regional retail website. According to other embodiments, a computer system executes components that enable a default regional corporate website to integrate international or regional specific information and functions, such as human resource information, office location information, and pricing information.

In these embodiments, the effort required to integrate the websites is substantially less than the effort required using conventional technology and approaches, which often prove arduous. These conventional approaches may include steps such as converting purchasing platforms to fit currency and shipping needs of the international customers and integrating standalone facilitator platforms that impose high integration fees, high transactional fees and high minimums. Other steps in these conventional approaches may include building distinct regional websites for several potentially relevant regions and providing the visitor with the ability to select one of the regional websites to browse. Building multiple websites can be too costly even for large organizations and impracticable for small organizations.

Thus, unlike some conventional systems that are configured to allow the user to select a visitor's region and provide a different websites based on the visitor's selection, at least some of the systems and methods described herein detect the internationally significant and insignificant content provided by the website provider, convert the detected content and integrate the converted content into the existing format and structure of the website.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Integration System

Some embodiments disclosed herein implement an integration system using one or more computer systems, such as the computer systems described below with reference to FIG. 4. FIG. 1 illustrates an exemplary integration system within the context of an exemplary overarching distributed computer system 100. As shown, FIG. 1 includes users 102, a website provider 104, an integration system 106, a user interface 108, computer systems 110 and a network 112. The user may interact (e.g., provide or receive information) with the user interface 108 on one of the computer systems 110. According to these embodiments, the integration system 106 monitors, identifies, and converts specific content 114 of a website provider 104.

According to various examples, the integration system 106 includes components, a monitoring engine 118 and a converting engine 120, configured to detect and convert website content 114 of the website provider 104 into website content suited to the needs of the users 102. In one example, the integration system 106 may detect and convert internationally significant content, such as, for example, weight, price, time zone, language, local customs and conventions, as well as other internationally significant information. This internationally significant content may include content pertinent to a user associated with a predetermined geolocation. In addition, the integration system 106 may detect and remove internationally insignificant content, such as, for example, regional advertisements, local promotional information, regional circulars and regional brick and mortar store information, as well as other internationally insignificant information. This internationally insignificant content may include content not pertinent to a user associated with the predetermined geolocation.

In some embodiments, the integration system 106 is customizable and allows the website provider to integrate a small or a large portion of the executable and non-executable content that can be provided by the integration system 106. For example, the integration system 106 can execute the functions that enable an IR to integrate an international merchant of record into the existing structure of the domestic retail website. Alternatively, the integration system can execute a portion of the functions available to provide only international shipping logistics into the existing structure of the domestic retail website.

As depicted in FIG. 1, the computer systems 110, the website provider 104, the integration system are coupled together and exchange (i.e. transmit or receive) information via the network 112. The network 112 may include any communication network through which computer systems exchange information. For example, the network 112 may be a public network, such as the Internet, and may include other public or private networks such as LANs, WANs, extranets, intranets, and cloud computing systems. Although shown as a single network in FIG. 1, in some embodiments, the network 112 includes a plurality of wired and wireless communication networks.

The website provider 104 can include any individuals and organizations making a website accessible via the network 112. The website can include a commercial website, offering goods and services for electronic commerce or an information website, proving information to some particular topic or purpose.

In the embodiment illustrated in FIG. 1, the website provider 104 and the integration system 106 are configured to implement the user interface 108 in conjunction with the computer systems 110 via the network 112. For example, in some embodiments illustrated by FIG. 1, the interface 108 is browser-based user interface served by website provider 104. In still other embodiments, the interface 108 is a specialized client program that executes outside of a browser environment, such as an application program executing on a mobile device. The user interface 108 may be implemented using a variety of technologies and may include sundry elements (e.g., screens, windows, buttons, boxes, etc) arranged according to various user interface metaphors.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other to techniques and protocols for communicating information may be used without departing from the scope of the examples and embodiments disclosed herein.

The integration system 106 and the website provider 104 system may be configured according to a variety of architectures. The architecture illustrated in FIG. 1 is provided for exemplary purposes only and embodiments disclosed herein are not limited to the architecture shown in FIG. 1. For example, in some of the embodiments, the physical components described below may be virtualized.

Figure 2:
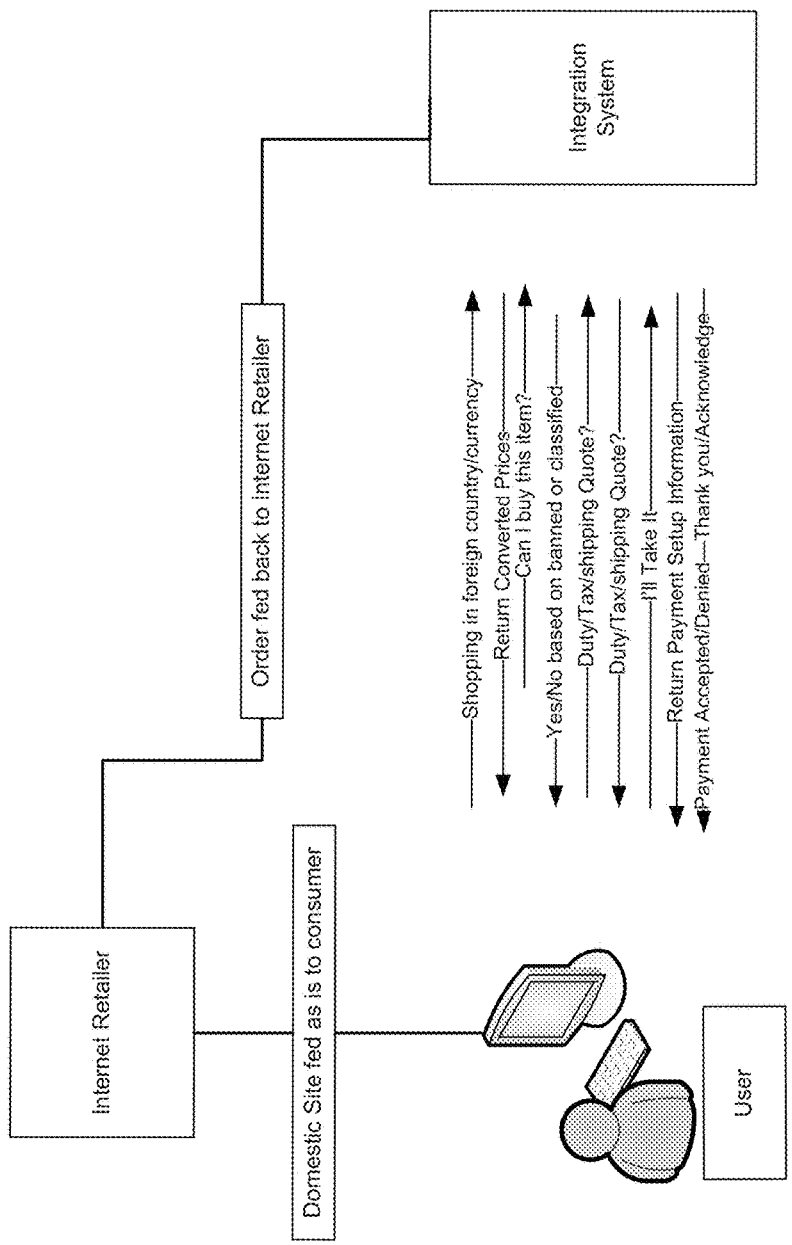
FIG. 2 is a schematic diagram of an integration system for an IR, according to one example.
Figure 3:
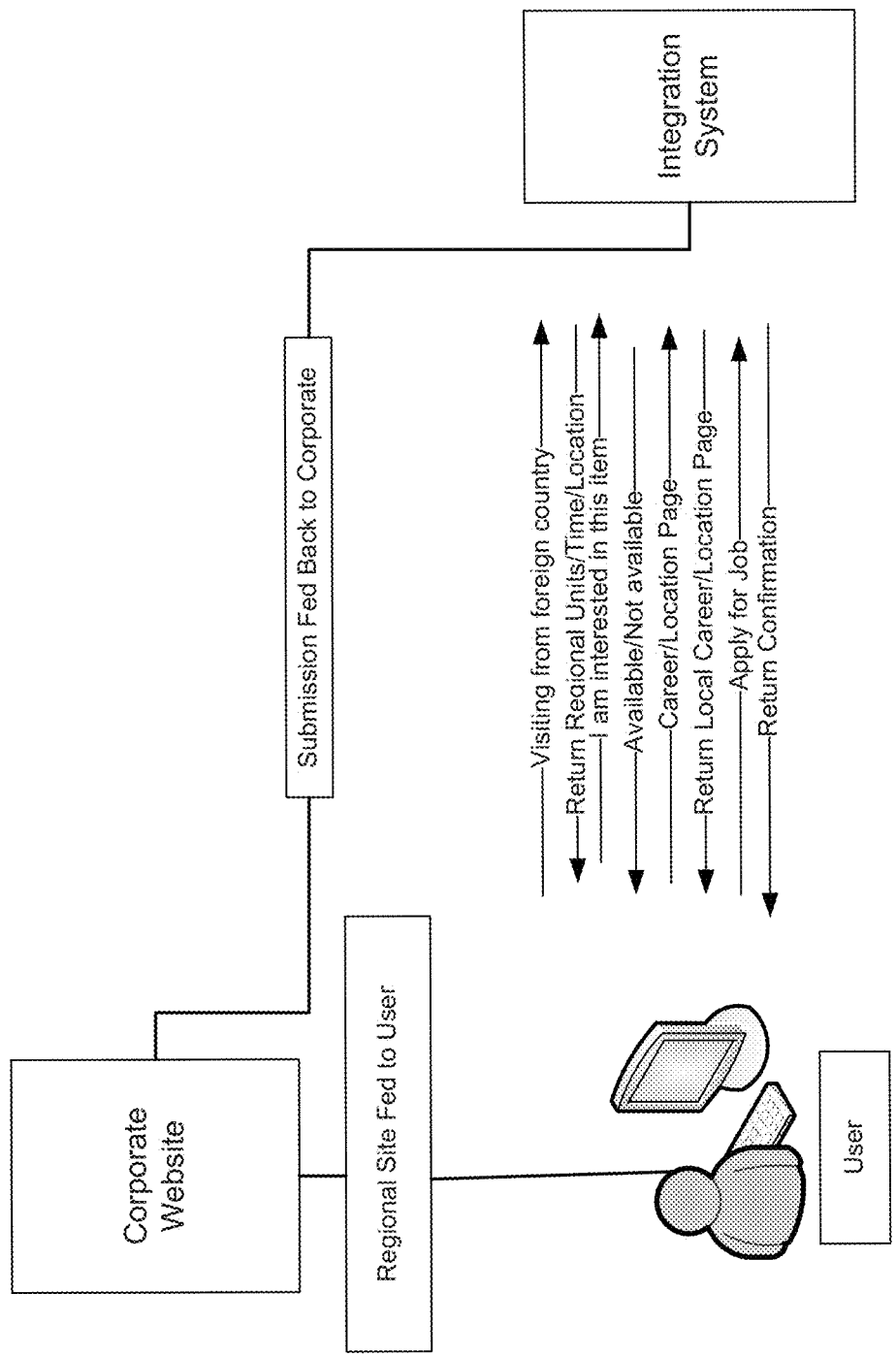
FIG. 3 is a schematic diagram of an integration system for a corporate website, according to one example.

The website provider 104 provides content 114 to the user 102 via the user interface 108 on one of the computer systems 110. Content 114 can include any executable or non-executable content (e.g., functions) which may be configured for a regional market. The regional market may be associated with a particular geolocation. For example, in one implementation, the website provider 104 is a web server and may include an IR website that displays products for purchase for a default regional market. As shown in FIG. 2, the consumer can visit and interact with the IR's website. The IR's website content may include a listing of products including descriptions of products, prices for products, advertisements for products, and description of products. The executable content can include shopping cart functions which allow the consumers to store products for future purchase, purchasing and payment functions, shipping calculating functions, shipping tracking functions and return functions.

The IR's content may be configured for a default regional market. For example, the products may be listed in default regional currency, default regional size and weight measurements, and in the default regional language. Prices for products may be discounted based on promotions targeting default regional customers. The functions may be configured for default regional markets. For example, the purchasing and payment functions may be configured to display totals in default regional currency, default regional time, accepting default regional forms of payment, and default regional coupons or promotional codes. The shipping calculating functions may be configured to provide default regional shipment, including accepting of shipping information in default regional format and calculating shipping prices for default regional locations.

In another implementation, the website provider 104 is a web server and may include a corporate website that displays information regarding the corporation targeted for a default regional user-base. A user can visit and interact with the corporate website and its content via the interface 108. The non-executable content of the corporate website may include corporate to information such as, for example, office location information, public relation information, promotions or advertisements, news or press releases, information about products and services, career information, and financial information (e.g. share price). The listing of products or services can include descriptions and prices for products and services. The executable content can include product or sample ordering functions, technical or customer support functions, or job application functions.

In this implementation, the corporate website content may be configured for a default regional user-base. For example, default regional location information is listed for offices, the products or services available only for the default region are listed in regional currency, default regional news may be prioritized over international news, and default regional career information may be prioritized over international information. The executable content may also be configured for the regional user-base. For example, the purchasing and payment functions may be configured to display totals in default regional currency, default regional time, and accepting regional forms of payment. The shipping calculating functions may be configured to default regional shipment, including accepting of shipping information in default regional format and calculating shipping prices for default regional locations. Technical or customer support functions may route customers directly to default regional call centers or default regional technical or support employees.

In one example, the monitoring engine 118 may receive and analyze information from the website provider 104 and from the computer systems 110 via the network 112. For instance, according to one embodiment implemented using JavaScript, the monitoring engine 118 is executed in response to a load event. In another embodiment implemented using jQuery, the mentoring monitoring engine 118 is executed in response to a ready event. The information received by the monitoring engine 118 may include geocoded indicators associated with the computer systems 110 and the user interface 108. The geocoded indicators can include IP addresses associated with the computer systems which may be associated with particular regional locations. The geocoded indicators can also include country codes that can be obtained from the user interface 108, and which can be associated with particular regional location. It is appreciated that the geocoded indicator may include any other regional indicators which may be associated with the computer systems 110 or the user interface 108.

In response to receiving the geocoded indicators, the monitoring engine 118 may compare the geocoded indicators to default geocoded indicators and determine whether the received geocoded indicator is associated with a region different from the region of the default to geocoded indicator. For example, the monitoring engine 118 may compare the geocoded indicators associated with the computer systems 110 with the default geocoded indicator associated with the website provider 104. In response to determining that the received geocoded indicator is different than the default geocoded indicator the converting engine 120 may transmit data descriptive of a welcome mat to the user interface 108. The user interface 108 may, in turn, render the welcome mat to a user, such as one of the users 102.

In one embodiment, the integration system 106 is configured to automatically provide the welcome mat to the computer systems 110 during the user's initial visitation of the website associated with the website provider 104. In one example, the welcome mat may provide a customizable localized experience for the user accessing the website of the website provider 104. The welcome mat can function as both a way of greeting and introducing the user to the localized experience and providing connections to one or more services available via the integration system 106.

Figure 4:
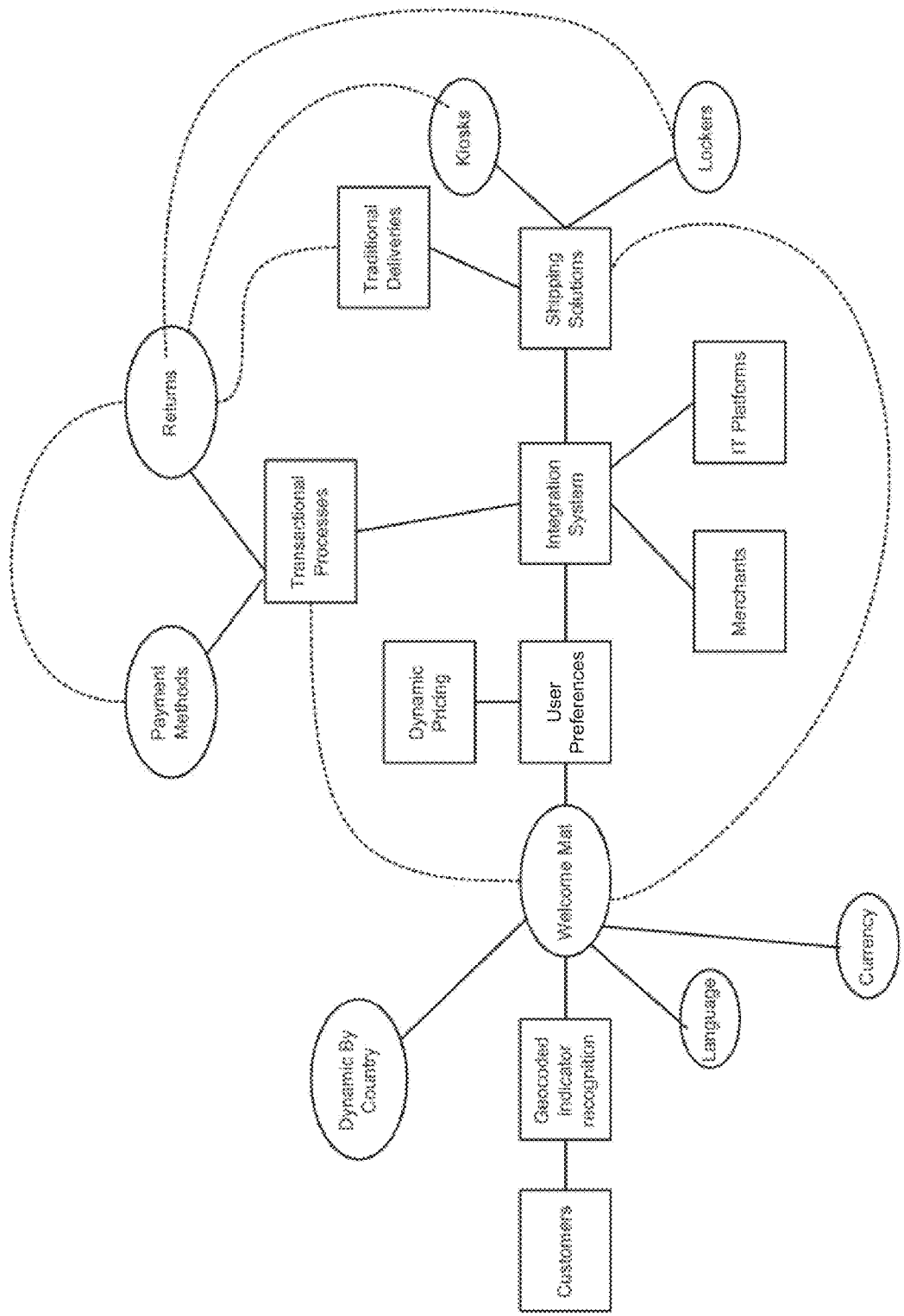
FIG. 4 is a context diagram including a welcome mat according to one example.

FIG. 4 shows one example implementation of a welcome mat integrated with the website provider. As shown in FIG. 4, the integration system 106 can be activated by customers accessing the website via a computer located in a region other than the default region associated with the website (i.e., user's geolocation). In response to the integration system 106 comparing the geocoded indicator, as described above, the integration system 106 can provide a welcome mat to the customers of the website.

The welcome mat may be displayed as a screen to customers accessing the website and provide both executable and non-executable content to localize the customer's website experience. The executable and non-executable content provided via the welcome mat can include information regarding language, currency of the website associated with the user's detected region, and provide information regarding functions and services available to the customer and any additional information localizing the customer shopping experience, such as the customer's shipping preferences. These preferences may favor deliveries to traditional destinations, as well as, deliveries to lockers or kiosks.

As shown in FIG. 4, the welcome mat is configured as a user interface through which the integration system 106 exchanges information with the customer. This information may include the user preferences described above in addition to other information used to configure the behavior of the web services 122. For instance, the welcome mat may provide graphical elements that allow the user to make selections that are received by the integration system, such as payment selections, language and currency selections, payment methods, shipping to solutions and return options. Other options and selections may be available to the customer via the welcome mat. In response to the selections received from the user via the welcome mat, the integration system can configure the different web services available via the integration system. For example, the integration system may configure dynamic pricing services, shipping services, payment services, and return services based on the inputs from the user.

The welcome mat may further enable the customer to access connections to transactional processes and shipping solutions available to the customer assessing the website. In one example of an IR website provider, these transaction processes can include payment methods and returns and the shipping solutions can include traditional deliveries, kiosk deliveries and locker deliveries. On example of a welcome mat in accord with FIG. 4 is described further below with reference to FIG. 7.

Returning to the example illustrated in FIG. 1, the information received from the website provider 104 may include specific, predetermined information targeted for integration or that indicates that integration is warranted. According to one implementation, the monitoring engine 118 may detect a variety of elements from the website content including page specific buttons, icons, images, text, tags, titles, objects, plug-ins, and other elements. For example, the monitoring engine 118 may search the content for predetermined elements, such as specific HTML tags or text associated with a particular document within the website, and upon finding one or more of the predetermined elements, determine that a conversion process is required. In other examples, the monitoring engine 118 can scan the content for pricing information formatted as $xx.xx, $xx and "$xx to $xx" (both with and without decimals).

The monitoring engine 118 may also determine that the regional language settings for the website provider 104 are different than the language setting of the user's interface, and thereby determine that a conversion process is required. In response to either of these determinations, the monitoring engine 118 may issue a notification to the converting engine 120 requesting that the converting engine 120 execute a conversion process, such as the conversion process described below with reference to FIG. 6.

The monitoring engine 118 may also identify predetermined executable content from the content provided by the website provider 104. The monitoring engine 118 may identify this executable content using a number of methods, such as identifying a function based on specific text in the website pathname. In one example implementation of the IR, the monitoring engine 118 may determine that the website window is associated with a shopping cart based on the website provider's web address, such as "http//website.com/shopping_cart.php." In an example implementation of a corporate website, the monitoring engine 118 may determine that the website window is associated with technical or customer support with reference to the website provider's web address, such as "http//website.com/contactus.php." Executable content may also be identified by detecting instantiation of particular functions, scripts, or objects. In response to identifying predetermined executable content, the monitoring engine 118 may issue a notification to the converting engine 120 requesting that the converting engine 120 execute a conversion process, such as the conversion process described below with reference to FIG. 6.

In some examples, the monitoring engine 118 and the converting engine 120 may be asynchronous and configured to receive information, transmit information and implement the conversion process based on predetermined triggers or actions. One example of an action can include a user selecting an international shipping destination. For example, a user browsing the IR's website may select an international shipping destination, via the interface 108. The computer system 110 transmits the information associated with the international shipping selection to the website provider 104. The monitoring engine 118 can detect this selection and the converting engine 120 can execute a conversion process, such as the conversion process described below with reference to FIG. 6.

An example of a trigger can include a detection of geocoded indicators associated with a user accessing the website from a region different from the default region of the website provider 104. As a result of detecting the geocoded indicator associated with another region, the monitoring engine 118 can transmit an indication of detection to the converting engine 120 and the converting engine 120 can execute the conversion process. For example, a user browsing the IR's website may transmit, an IP address associated with the computer system 110, which may indicate that the computer system is located internationally. The monitoring engine 118 can detect the international IP address and transmit the indication to the converting engine 120 can execute the conversion process.

According to some examples, once the monitoring engine 118 detects the content targeted for integration, the converting engine 120 is configured to respond by converting the content into modified (or converted) content suited to the particular user, the user interface, or the computer system. In one implementation, if no response is received from the converting engine 120, or if no response is received within a predetermined period of time, the conversion process can be paused or halted.

The content targeted for integration can include a portion of the content provided by the website provider 104. This conversion process may create, replace, change, update, add or remove a portion of the content normally provided by the website provider 104. In various examples, the conversion steps can occur all at once for every page associated with the website. For example, the monitoring engine 118 can detect an action or a trigger and the converting engine 120 is configured to convert the regional content on-demand as the user visits a particular page associated with the website provider 104.

In various examples, the converting engine 120 generates website content with formatting that matches other content provided by the website. For example, in some embodiments, the converting engine 120 includes CSS style sheets associated with the website and that cause content generated or integrated by the converting engine 120 to match the formatting of the default content provided by the website when displayed in a conventional browser. Matching the website formatting and styling options allows the operation of the integration system 106 to be undetectable to the user as coming from another source.

In one example, the conversion process executed by the converting engine 120 can include steps of converting website content associated with one region into website content associated with another region. The steps can include removing the information associated with one region (e.g. website default region) and replacing it with information associated with another region (e.g. user's region) within the existing structure and format of the website. In some examples, the converting engine 120 may receive content from the monitoring engine 118 to be converted and perform one or more converting functions and output converted content. The converted content may be displayed by the computer systems 110 via the user interface 108.

In an example implementation of a regional IR, the converting engine 120 may convert pricing in default regional units for products into pricing in units of the user's detected region (e.g. US dollars to UK pounds). In an example implementation of a corporate website, the converting engine 120 is configured to replace default regional product information with information for products available in the user's detected region. For example, the converting engine 120 may remove weight information listed in website's default units of measure and replace the information with the user's regional units of measure (US pounds to EU grams and kilograms), replace nutritional information listed in website provider's default units with user's regional units (US cal to kilo-cals or kilo-joules), or clothing or shoe sizing information listed in website provider's default units with regional sizes (US sizes to UK or EU sizes).

In this example, as the default regional information is replaced with user's regional information, the converting engine 120 places the converted information into the same location on the webpage as the original information. The converted content, in one example, has the same formatting, including size, font, color and layout as the original. Replicating the formatting of the original content allows the integration system 106 to provide the converted content seamlessly with the user unaware that a conversion has taken place.

According to another example, the conversion process can include steps of removing website content associated with one region (e.g. the website's default region) from the website of the website provider. For example, the website content to be removed can include internationally insignificant information such as regional advertisements, local promotional information, regional circulars and regional brick and mortar store information, as well as other internationally insignificant information. As the information is removed, the converting engine 120 retains the general layout of the website, for example, keeping the same table size and shape so as to provide uninterrupted look and feel to the website.

Although FIG. 1 illustrates the monitoring engine 118 and the converting engine 120 within the integration system 106, in some embodiments, the monitoring engine 118 and the converting engine 120 are stored and executed on other systems or distinct systems. For instance, either or both of the monitoring engine 118 and the converting engine 120 may be executed on the website provider 104 or the computers 110. Thus embodiments are not limited to a unitary integration system 106 as illustrated in FIG. 1.

The integration system 106 may also include one or more web services 122 which may be accessed by the converting engine 120 to allow the seamless integration into the website of the website provider 104. In one embodiment, the web services 122 are configured to expose an interface through which the web services receive and respond to service requests. These service requests may include information that subscribes to a protocol supported by the interface and that is descriptive of the service requested by the service request. Further, in this embodiment, the converting engine 120 is configured to generate and receive responses to these service requests.

In an example implementation of the IR, the web services 122 may include providing shipping, tax or duty estimates, providing real time currency weight and size exchanges, providing a return portal for the user to return products, providing payment portals and validation of payment information. In an example implementation of the corporate website, to the web services 122 may include shipping information, tax and duty estimates, job submission portals, and news search portals. In one example implementation, the web services may be provided via RESTful web services.

In some examples, the web services 122 can replace executable content provided by the website provider. For example, the shipping functions or the shopping cart functions provided by the IR targeted for a regional user can be replaced with the shipping or the shopping cart functions targeted for an international user. In one example, the converting engine 120 can reconfigure the HTML links associated with some functions on the website to be redirected to locations of the web services 122 associated with the integration system 106. For example, the "checkout" button associated with payment on the IR website can be reconfigured to redirect to the payment web services 122 provided by the integration system 106.

In other examples, the web services can be provided in addition to the executable and non-executable content provided by the website provider. For example, payment validation and fraud services can be provided with the website content and functions. The additional functions can be performed as an activation of a particular function is detected or certain content is transmitted. For example, as the integration system receives credit card information entered by a user and a confirmation to charge the card, the integration system 106 can assess the web service associated with fraud detections.

In these examples, there may be non-executable content provided with executable content. For example, the shipping functions included in the web services 122 are provided showing destination address information, shipping cost information, estimated time of arrival information as well as other pertinent content. The converting engine 120 is configured to convert the content into the formatting associated with the website provider.

It is to be appreciated that the functionality provided by the web services varies between embodiments and embodiments are not limited to a particular service requests or protocols used to communicate service requests. For instance, some embodiments use remote procedure calls to process service request. Thus embodiments are not limited to a particular technology to exchange information between systems.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
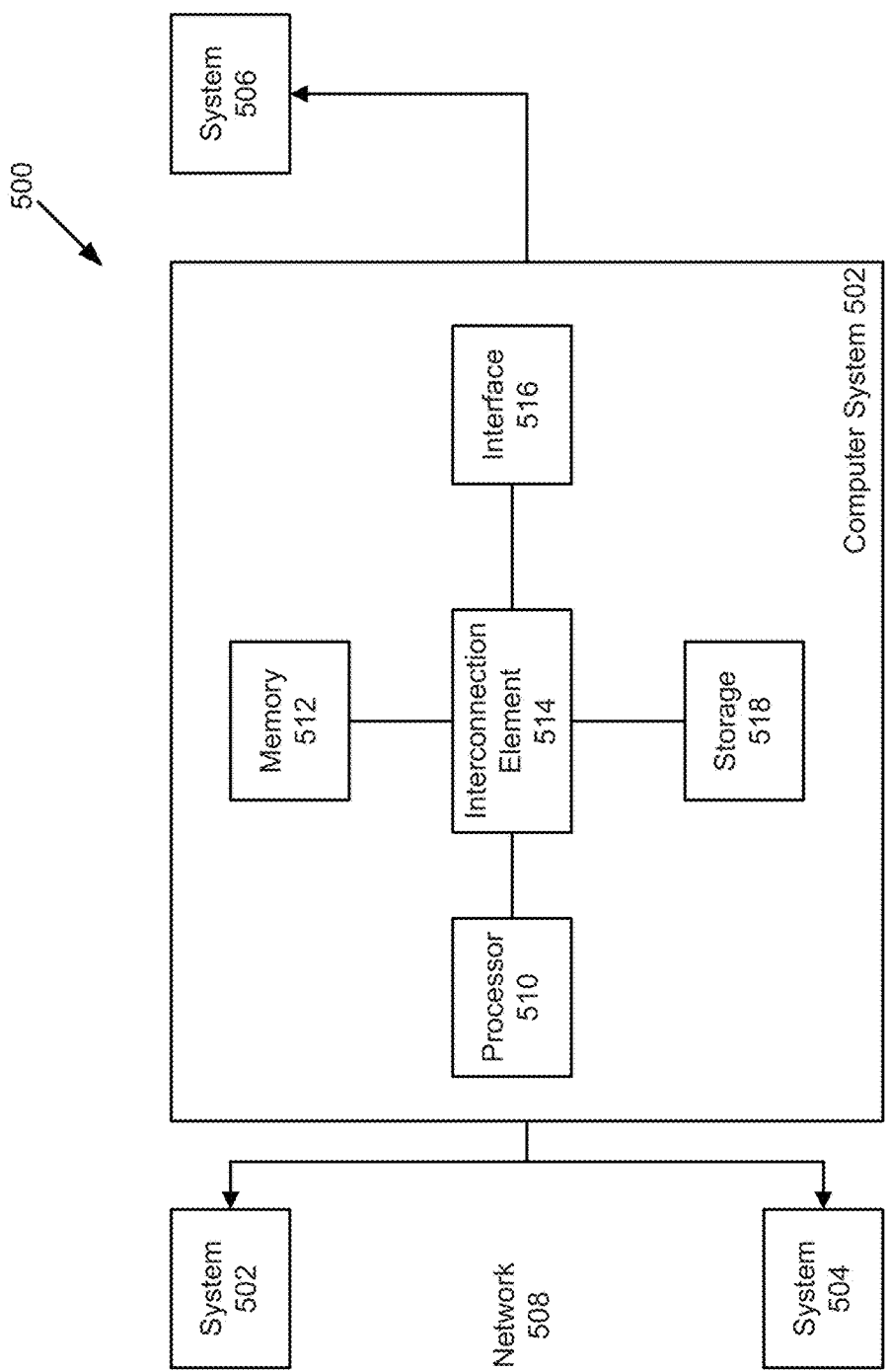
FIG. 5 is a schematic diagram of one example of a computer system that may perform processes and functions disclosed herein.

Referring to FIG. 5, there is illustrated a block diagram of a distributed computer system 500, in which various aspects and functions are practiced. As shown, the distributed computer system 500 includes one more computer systems that exchange information. More specifically, the distributed computer system 500 includes computer systems 502, 504 and 506. As shown, the computer systems 502, 504 and 506 are interconnected by, and may exchange data through, a communication network 508. The network 508 may include any communication network through which computer systems may exchange data. To exchange data using the network 508, the computer systems 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage element 518. To implement at least some of the aspects, functions and processes disclosed herein, the processor 510 performs a series of instructions that result in manipulated data. The processor 510 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory ("DRAM") or static memory ("SRAM"). However, the memory 512 may include any device for storing data, such as a disk drive or other nonvolatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical busses, for example, busses between components that are integrated within a same machine, but may include any communication coupling between system elements including specialized or standard computing bus technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices to allow the computer system 502 to exchange information and to communicate with external entities, such as users and other systems.

The data storage element 518 includes a computer readable and writeable nonvolatile, or non-transitory, data storage medium in which instructions are stored that define a program or other object that is executed by the processor 510. The data storage element 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage element 518. The memory may be located in the data storage element 518 or in the memory 512, however, the processor 510 manipulates the data within the memory, and then copies the data to the storage medium associated with the data storage element 518 after processing is completed. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system to that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory to (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Website Integration Processes

Figure 6:
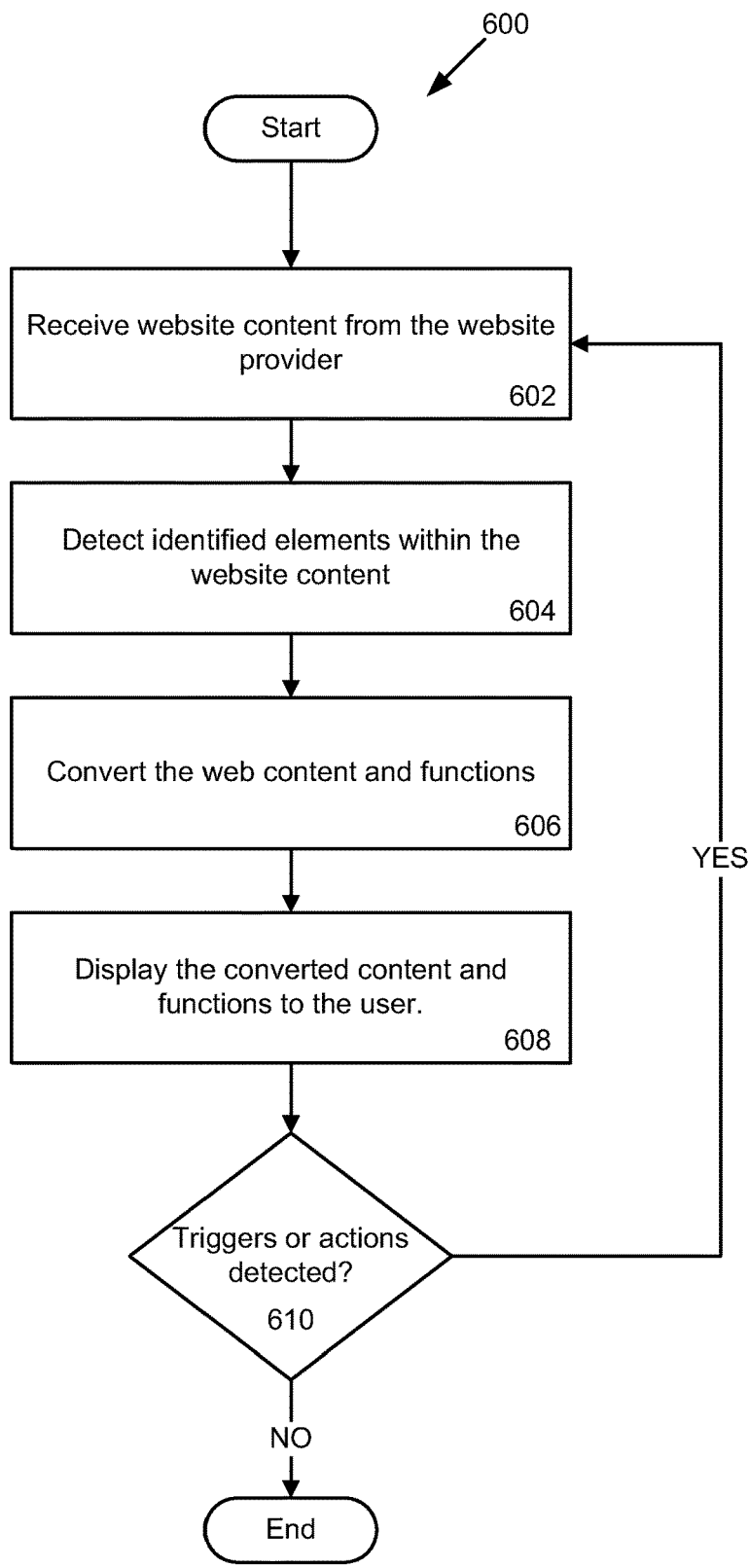
FIG. 6 is a flow diagram of a method of performing integration, according to one example.

In some embodiments, processes are performed that integrate website contents using an integration system, such as the integration system 106 described above with reference to FIG. 1. An example of one of these website integration processes is illustrated by FIG. 6. According to this example, the website integration process 600 includes acts of receiving website content from a website provider, detecting elements within the content, converting the content and displaying the converted content to the user.

In act 602, the integration system, analyzes web content generated by a website provider, such as the website provider 104 in FIG. 1. The web content may include executable and non-executable content. In one example implementation, the integration system can automatically receive information associated with the website hosted by the website provider. The integration system may be asynchronous and may receive and convert information based on triggers or actions associated with the website. In one example, the triggers or actions are received from the user interface and the computer system, such as one of the computer systems 110 and the user interface 108 in FIG. 1. In some examples, triggers or actions can include an action by a user, via a user interface, and a transmission from a computer system associated with the interface. In another example, the triggers or actions can include detection of a geocoded indicator such as a country code associated with another region or an IP address associated with another region.

As discussed above, in one example, the website content can include IR information such as listing of products including descriptions of products, prices for products, advertisements for products, and description of products. In another example, the website content may corporate information including location information, public relation information, promotions or advertisements, news or press releases, information about products or services, career information, and financial information (e.g. share price). The listing of products or services can include descriptions and prices for products and services.

In some examples, the website content can include product pricing information including a representation of a first currency within text, graphics, or other renderings. In one example, the first currency can be a currency associated with the website's default region (e.g., US dollars) and the website content can include text formatted in the first currency (e.g., US dollar symbol). The web content can further include one or more delivery services. In one example, the delivery services can include a parcel delivery service such as a global or a regional courier delivery service, including both independent, corporate or government offered services.

The integration system may also detect information pertaining to executable content provided by the website provider, such as the website provider 104. One example of executable content can include executable content configured to execute a transaction or a purchase of products or services in a one type of currency (e.g. the default regional currency). The information pertaining to executable content can include information pertaining to shopping cart functions, which allow the consumers to store products for future purchase, purchasing and payment functions, purchase method validation functions, fraud detection functions, shipping calculating functions, shipping tracking function and return functions. Other executable content can include product or sample ordering functions and shipping functions, technical or customer support functions, job search and application functions, news and press release display functions.

The website content and the associated formatting information pertaining to the content can be stored by the integration system. In one example, the integration system can store the received content information remotely in a storage medium associated with the integration system. In another example, the integration system can store the information on a storage medium associated with the computer system of the user. In one example, the information may be stored in the form of a web cookie on the storage medium associated with the computer system of the user.

The integration system can display a representation of a welcome mat. The welcome mat can be displayed in response to detection of geocoded indicators of a geolocation associated with the user's computer system. The representation of the welcome mat can include an identifier of a language, an identifier of a currency, and an indicator of shipping preferences. The identifier of the language, the currency and the shipping preferences can be related to the detected geocoded indicators. The shipping preferences can include an indicator of a preferred destination for the user such as for example, an occupiable structure, such as a residence or a business office, a kiosk, or a locker.

In act 604, the integration system detects one or more identified elements within the web content. The identified elements can include elements associated with internationally significant and insignificant information. The identified elements can also include formatting elements associated with the internationally significant and insignificant information. In one example, the integration system may detect a variety of elements from the website content including page specific buttons, icons, images, text, tags, titles, objects, plug-ins, layout, colors, and fonts, and other elements. Functions may also be detected by detecting instantiation of particular functions, objects or scripts. For example, the integration system can compare keywords associated with particular functions or scripts to determine if a particular function or script is activated or has been activated.

The integration system may also detect specific executable content on the website of the website provider. This executable content may be detected using a number of methods, such as methods that detect specific text associated with or invoking the function in the website pathname. For instance, in an example implementation of the IR, the monitoring engine 118 may determine that the website window is associated with a shopping cart based on the website provider's web address, such as "http//website.com/shopping_cart.php." In an example implementation of a corporate website, the monitoring engine 118 may determine that the website window is associated with technical or customer support based on the website provider's web address, such as "http//website.com/contactus.php."

In act 606, the integration system is configured to convert a portion of the content into converted content. In various examples, the integration system can remove, replace, add, change, or update content or functions provided by the website provider. In the conversion process, according to various examples, the integration system can access formatting elements or presentation semantics to conform the replacement content to the presentation semantics associated with the website provider.

In one example, the conversion process can include steps of converting a portion of the website executable and non-executable content associated with one region into executable and non-executable content associated with another region. The content associated with one region can be configured for one geolocation and the converted content can be configured for another geolocation and the conversion process can include generating a representation of currency tenderable at the other geolocation. For example, the conversion process can include converting text formatted as one currency associated with one region into text formatted as another currency associated with another region, such as converting prices listed in US dollars into prices listed in UK pounds.

The content configured for one geolocation can include an identifier of a parcel delivery service that services the geolocation, for example a local parcel delivery service. The conversion process can convert the identifier of the parcel delivery service to another identifier of a parcel delivery service that services another geolocation, for example an international parcel delivery service, or another region's local parcel delivery service.

The steps can include removing at least a portion of the content associated with one region (e.g., the website default region) and replacing it with content associated with another region (e.g., the user's region). According to another example, the conversion process can include steps of removing a portion of executable and non-executable content associated with one region (e.g. the website's default region) from the website of the website provider.

In some examples, the conversion process can include reconfiguring a portion of the web content to execute at least one process in place of the executable content. For example, the executable content may be configured to execute a transaction in one currency (e.g., US dollars) and the process is configured to execute the transaction in another currency (e.g., UK pounds). In other examples, the executable content can include a domestic shipping function configured for the website's default region (e.g., US based addresses) to be reconfigured to execute an international shipping process in place of the shipping function.

In other examples, the conversion process can include adding executable and non-executable content of the integration system in place of the content or functions of the website provider. For example, the conversion process can include adding international shipping functions into the website provider's website.

In act 608, the integration system displays the converted content to the user, via the user interface, for example the user interface 108 in FIG. 1. The converted content, as noted above, can be displayed using the formatting elements of the website provider to allow for seamless integration of the additional or replacement content into the website. In act 610, the integration system determines if additional actions or triggers are detected. If the triggers or actions are detected, the method returns to act 602, and the method 600 can be repeated.

User Interface Screens

FIGS. 7-11 illustrate interface screens provided by an example implementation of the integration system including a regional IR and an international online shopper. It is to be appreciated that many other interface screens may be provided, and embodiments described herein are not limited to a particular interface screen or set of screens. In this embodiment, the monitoring engine 118 detects the international online shopper's country code as UK and an IP address of the online shopper as located in UK.

Figure 7:
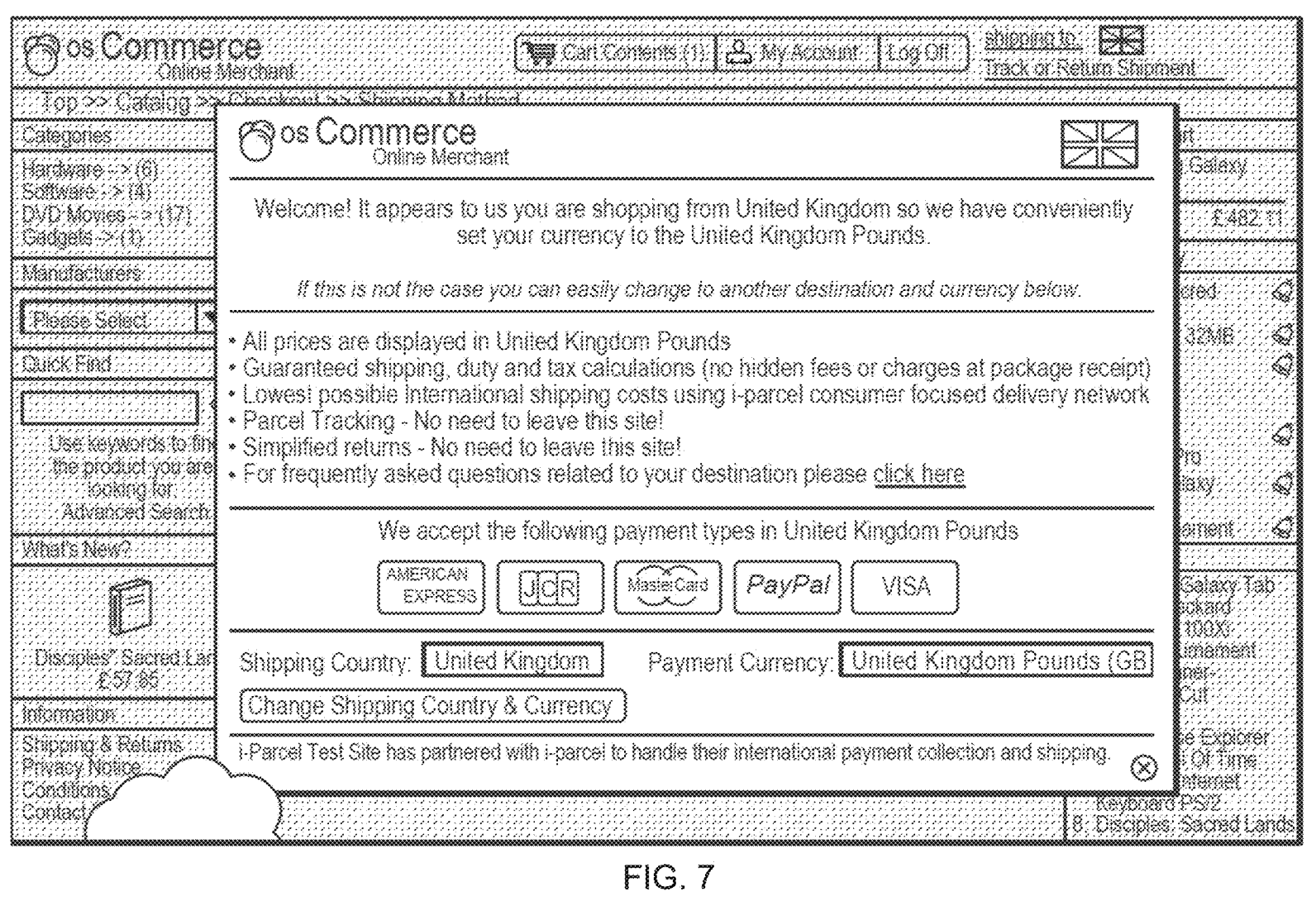

In various examples, the converting engine 120 may provide a "welcome mat" in local language to the online shopper once his/her associated region is electronically determined, which may be a geolocation associated with the shopper. FIG. 7 shows one example of the welcome mat customized to the UK. The welcome mat may include currency settings, and information about payment and shipment processing and may further allow the online shopper to change the detected settings. The welcome mat may also include links to other web services 122. For example, the welcome mat may have the ability to access a frequently asked questions section relative to the online shopper's location. The frequently asked questions section may be presented in the default region language or a language that is localized to the online shopper.

Figure 8:
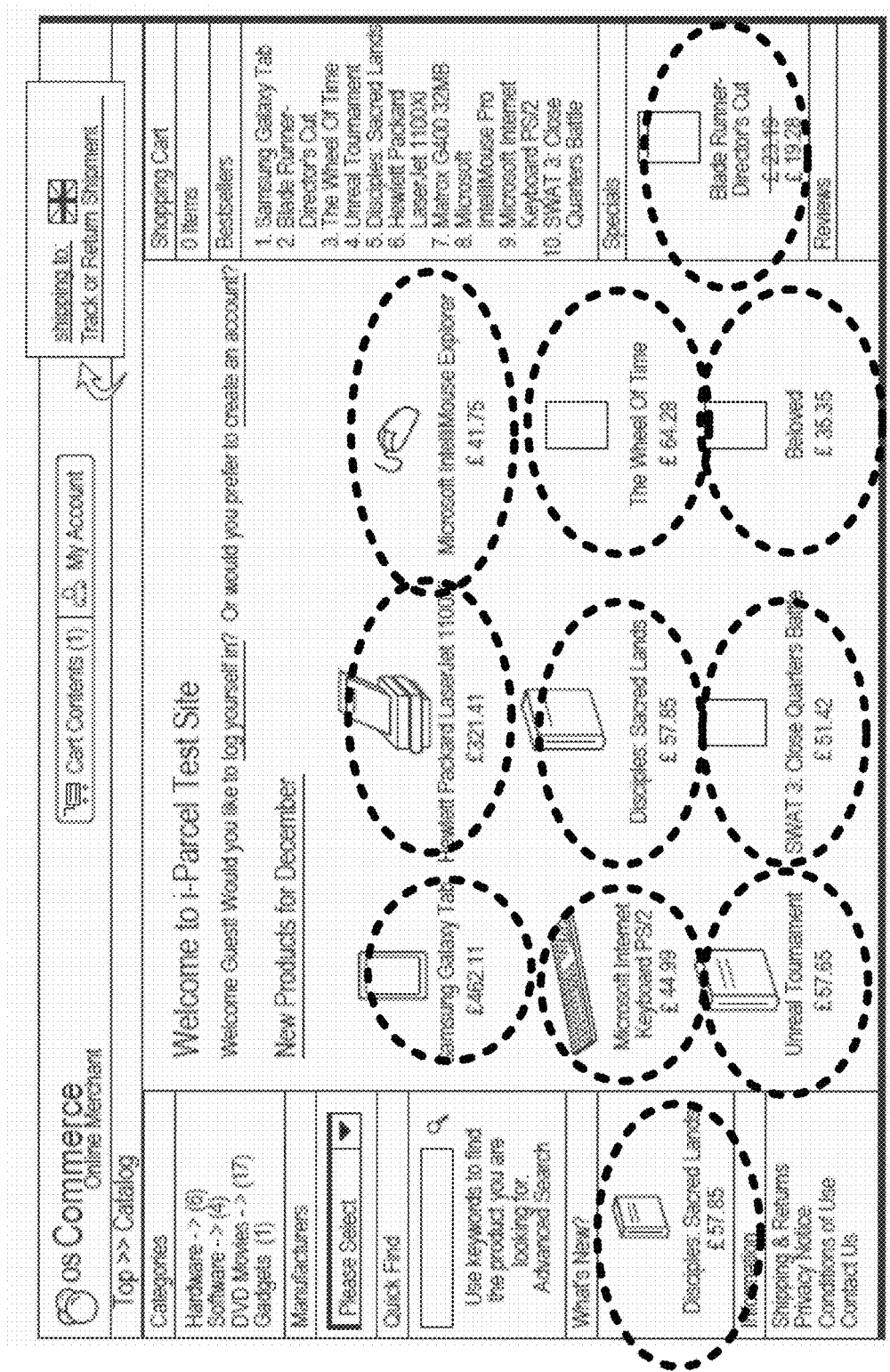
FIG. 8 is an illustration of another screen provided by an integration system according to one example.

The online shopper from another region can then navigate the IR's website, which includes products available for purchase, although the IR's website is only provided by the IR for US based online shoppers. The monitoring engine 118 can detect prices for products listed in US dollar prices and the converting engine 120 is configured to convert the prices into UK pounds. The converting engine 120 matches the style and formatting of the product listing and the price listing for the conversion to be undetectable to the online shopper. FIG. 8 shows one example of the products screen with US prices detected by the monitoring engine 118 and replaced by the converting engine 120 into UK pricing. The converting engine 120 may convert and display item pricing on the IR's site in the UK currency as the local currency of the online shopper throughout the online shopper's shopping experience.

In some examples, the user can change the region associate with the user. In one example, changing the region settings can act as a trigger to change the content on the website. The user can select the "shipping to" link to change the destination location to another geographic region, for example to AU. The converting engine 120 can receive this input from the user and can change the shipping location as well as the other functions and contents to be configured for the selected region.

Figure 9:
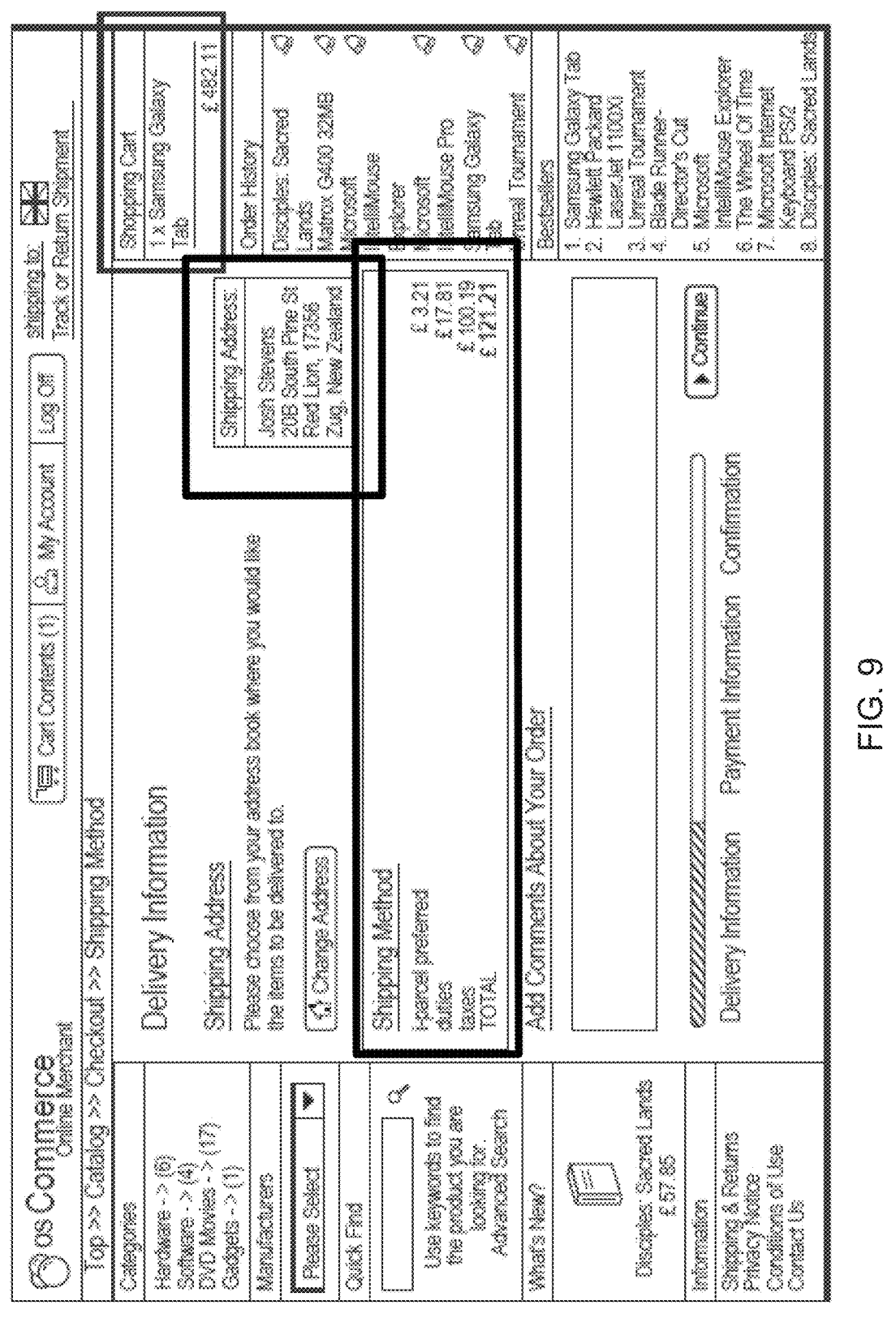

The converting engine 120 may similarly convert and display content converted to the to region associated with the online shopper throughout the shopping experience. FIG. 9 shows the converted delivery and shopping cart information website displayed to the user. As shown, the shopping cart information includes the total items calculated and provided in UK pounds converted from US dollars. According to at least one embodiment, the online shopper entering shipping information may enter the information into user interface elements provided by the integration system. These elements, in turn, may provide the entered information to a back-end server via RESTful web services. To the user the entry appears to be into a unitary website. The integration system receives the shipping information and then displays the information where the shipping information would normally be located on the website.

Similarly, the integration system may calculate and provide real time duty, tax, and shipping information based on the online shopper associated region. In one embodiment the integration system exposes this functionality via web services and presents results of the web services processing in the IR's website. As shown in FIG. 9, the integration system computes shipping costs, duty totals and taxes in the local currency of the online shopper and displays this information on the IR's website at checkout.

Related to shipping web services, in various examples, the integration system can provide the ability for the IR to display flat rate shipping, vary it by country and display it at checkout to the international online shopper. The integration system may provide the ability for the IR to display free shipping, vary it by country and display it at checkout to the international online shopper. The integration system can further provide the ability for the IR to display free shipping and set price points as triggers, for example, by providing free shipping over a certain item total. The integration system may also vary those triggers by country and display it at checkout to the international online shopper.

The integration system can also integrate duty, tax and shipping adjustments by country into item cost. For example, the converting engine 120, rather than just converting the price of the item into local currency, the converting engine 120 can replace the price with an adjusted price including duty, tax and shipping adjustment. The price conversion function of the integration system, provides the ability for the IR to alter item prices in local currency as a function of other cost components such as duty, tax and shipping. For example, an IR would be able to shift item prices on their site up 10% and take the cost of shipping down 10% or take item prices up 20% and offer free shipping.

Figure 10:
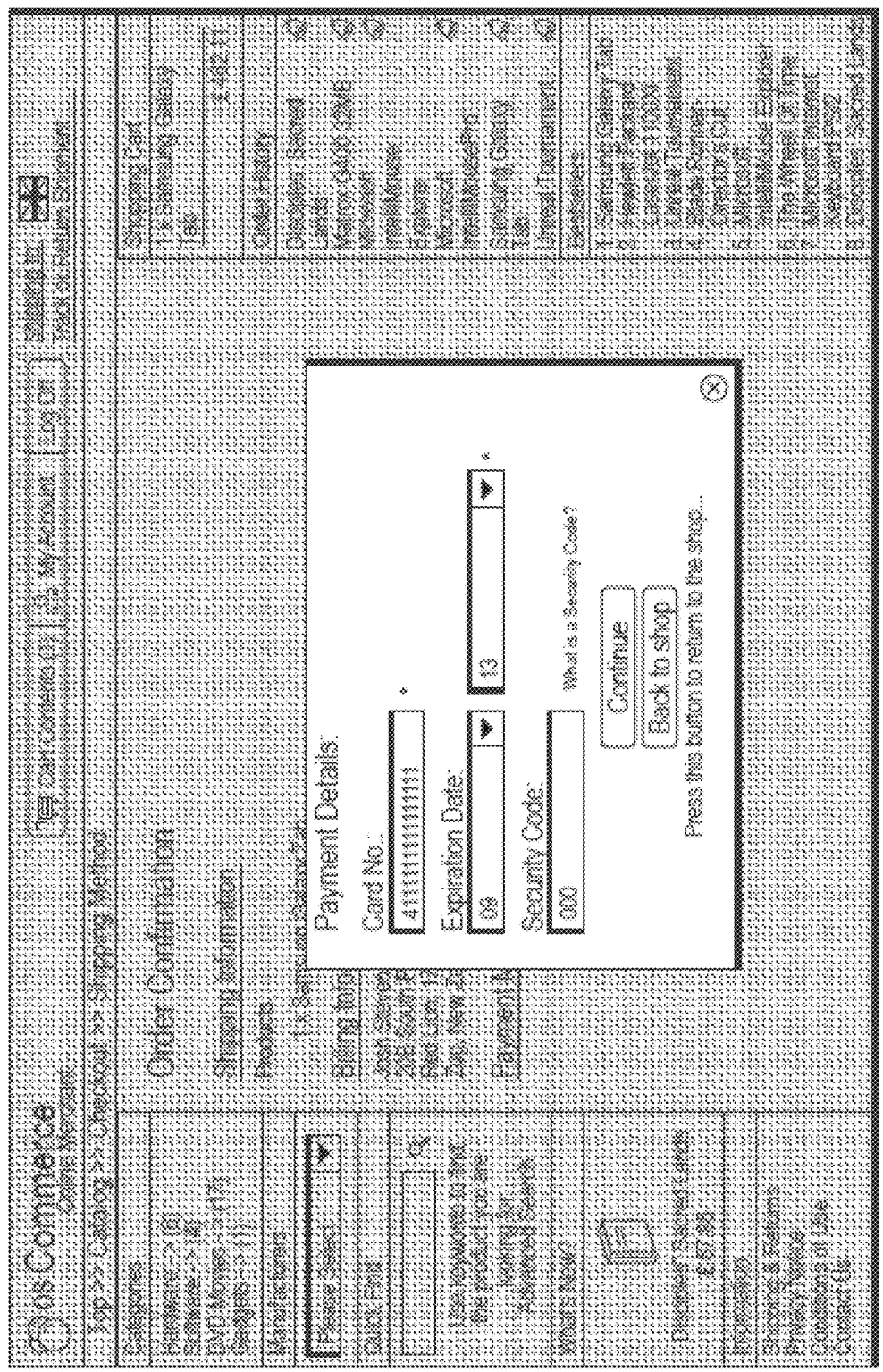
FIG. 10 is an illustration of another screen provided by an integration system according to one example.

In addition, the integration system can provide payment selection and payment to collection web services. FIG. 10 shows one example of collecting payment via various payment methods based on the online shopper's local currency. In various examples, the integration system can act as the merchant of record receiving payment information directly from the user. Alternatively, in other examples, the integration system can add selectively only for shipping and parcel tracking services and leave the payment collection to the website provider.

Figure 11:
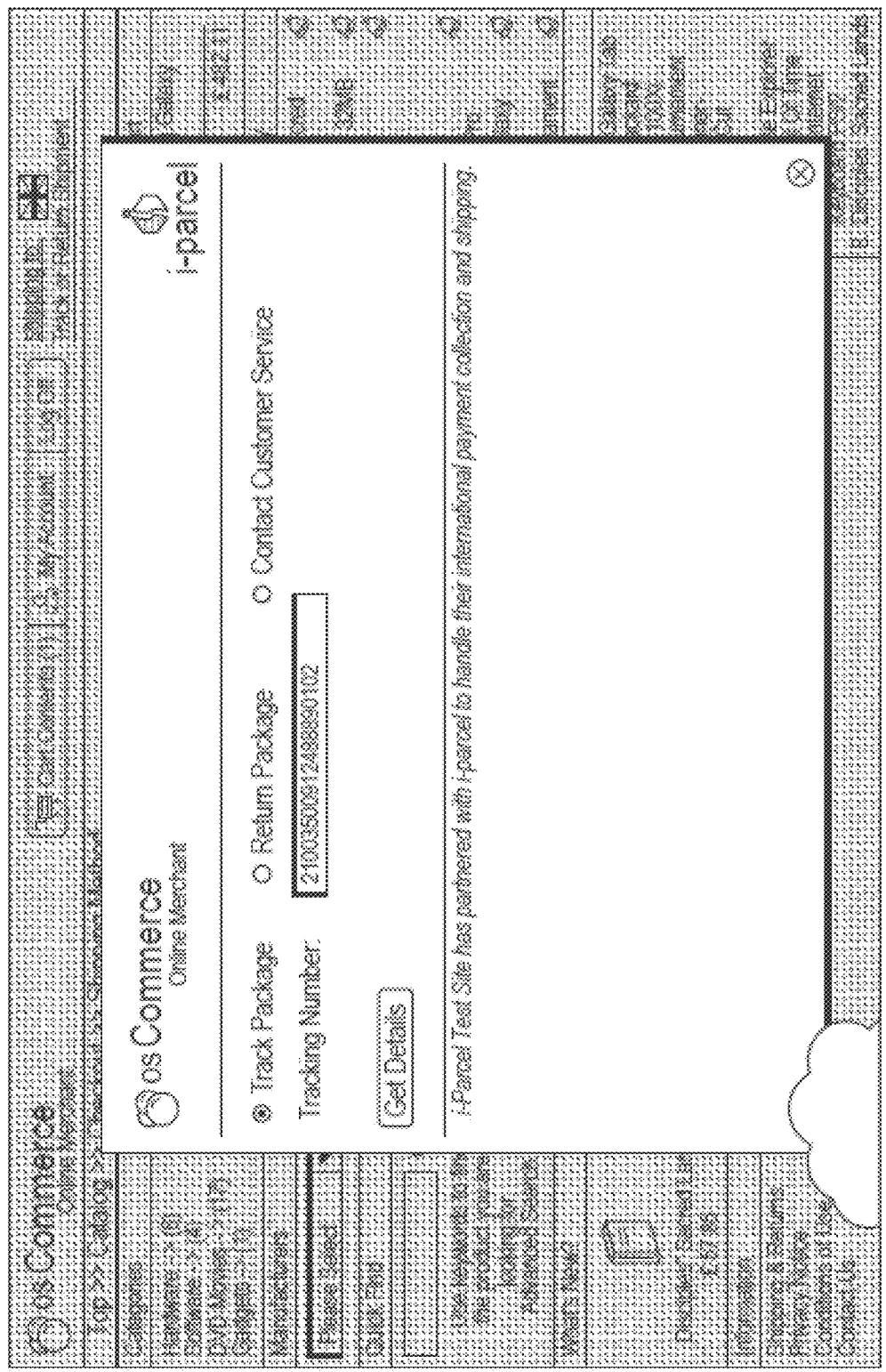
FIG. 11 is an illustration of another screen provided by an integration system according to one example.

The converting engine 120 may also add executable and non-executable content to the website to provide a complete and seamless integration experience for the user. For example, the integration system can provide parcel tracking services by providing a mechanism for the online shopper to view specific tracking information about their international shipment without ever leaving the IR's website. FIG. 11 shows one example of providing parcel tracking. In some examples, parcel tracking was not previously available through the IR's website.

However, in other examples, the integration system can add content to the functions and services provided by the website provider by rewiring content on the website. In one example, the parcel tracking services can be added into the website as the user selects "track my package" in the options available to the user. The link associated with the "track my package" option can redirect the user to the web services available from the integration system.

Similarly, the integration system can also provide a mechanism for the online shopper to return some or all of their merchandise without leaving the IR's website. As noted above, the integration system can add content into the function and services provided by the IR. In one example, the return merchandize functions can be added into the website as the user selects "return my package" in the options available to the user. The HTML link associated with the "return my package" option can redirect the user to the web services available from the integration system. In addition, the integration system may prove a mechanism for the online shopper to electronically contact the integration system's customer service department. The integration system can add an HTML link to a region specific inquiry form for a user to fill out and then transmit the inquiry form to designated customer service representatives associated with the user's region.

Figure 12:
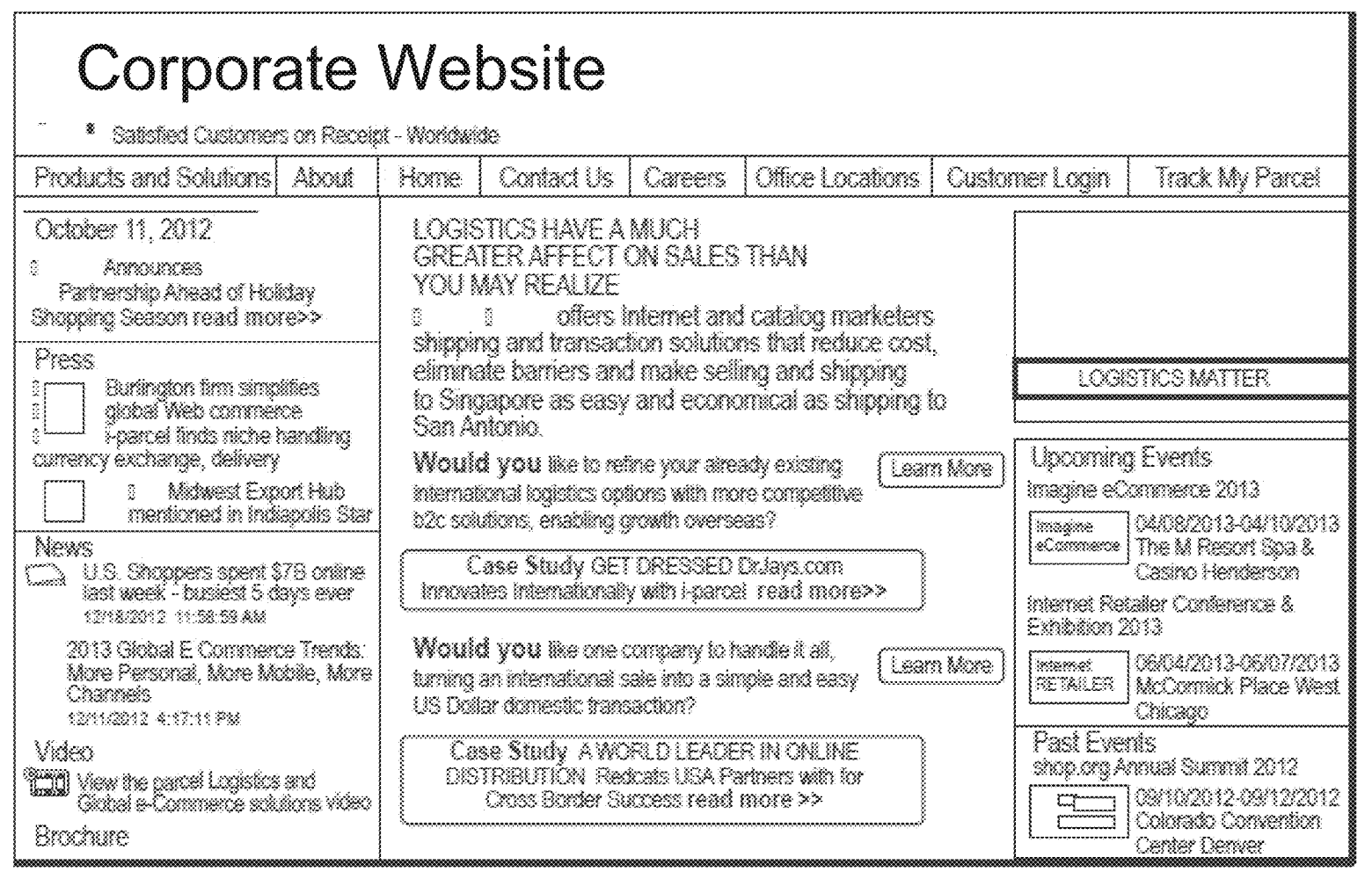
Figure 13:
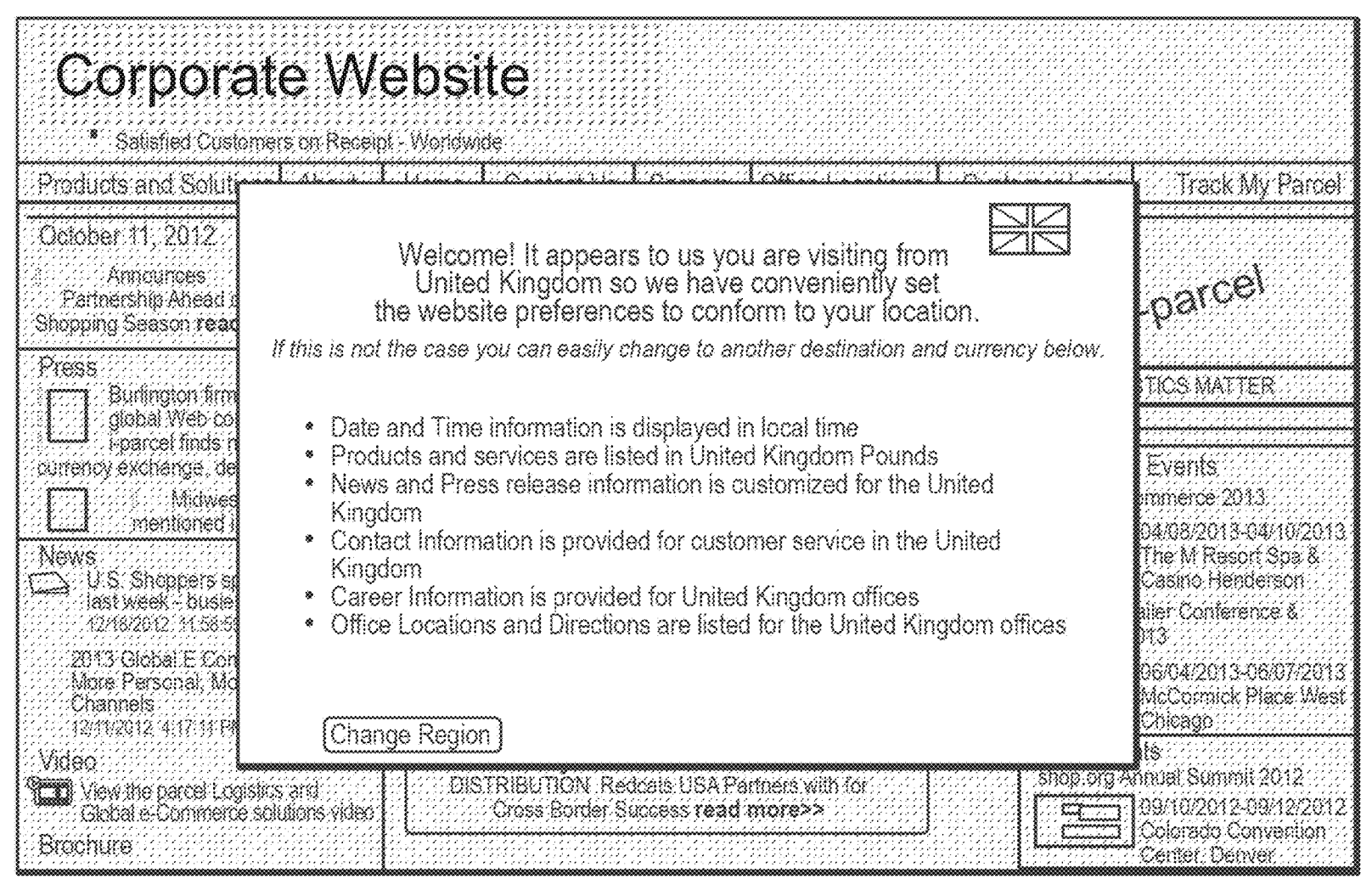

FIG. 12 and FIG. 13 illustrate interface screens provided by an example implementation of the integration system including a regional corporate website and an international website visitor. It is to be appreciated that many other interface screens may be provided, and embodiments described herein are not limited to a particular interface screen or set of screens. FIG. 12 shows one example of a corporate website configured for a default regional market, in this example the US market. The corporate website date and time information is displayed in Eastern Standard Time, products and services are listed in US dollars, news and press release information is displayed targeting US visitors. The website includes a link to contact information (e.g. "contact us") which provides an inquiry form directed to local customer service. The website includes a link to career information (e.g. "careers") which provides a listing of US based jobs. The website also includes a link to office locations and direction (e.g. "Office Location") which provides a listing of US based offices and directions to the offices.

In this embodiment, the monitoring engine 118 detects the international visitor's country code as UK and an IP address of the visitor as located in UK. In various examples, the converting engine 120 may provide a "welcome mat" in the language associated with the visitor's region. FIG. 13 shows one example of the welcome mat customized to the UK region. The welcome mat may include currency settings, and content conversion settings and may further allow the visitor to change the detected settings (e.g., by selecting the change region button).

The visitor from another region can then navigate the corporate website although the corporate website is only provided by the corporate website for US based visitors. The monitoring engine 118 can detect default regional information, such as time provided in Eastern Standard Time, news and press listings provided for US visitors, and prices for products listed in US dollar prices. The converting engine 120 is configured to convert the EST time into GMT time, provide news and press listings with content targeted to UK visitors, and US prices into UK pounds. The converting engine 120 may retrieve the news and press listings via a web services call to an application server configured to receive and respond to web service requests for this content. The converted content matches the style and formatting of the default content so that the conversion to be undetectable to the visitor.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer system, comprising:
   a first network connection to establish a first communication with a vendor server, the first network connection being distinct from a previously established consumer computer-to-vendor server network connection;
   a second network connection to establish a second communication with a consumer computer, the second network connection being distinct from the previously established consumer computer-to-vendor server network connection;
   a monitoring component, executed by at least one processor, to monitor a geocoded indicator received from the consumer computer, the geocoded indicator associated with first regional purchasing information web content generated by the vendor server for the consumer computer;
   the monitoring component is further configured to:
   compare the received geocoded indicator to a default geocoded indicator of the vendor server; and
   determine whether the geocoded indicator is associated with a region different from a region of the default geocoded indicator;
   a converting component, executed by the at least one processor, to convert at least one portion of the first regional purchasing information web content associated with a first geographic area into second regional purchasing information web content associated with a second geographic area, in response to: (a) determining that the region of the geocoded indicator is different from the region of the default geocoded indicator; and (b) detecting one or more items of predetermined executable content of the first regional purchasing information web content corresponding to shipping functions, presented via a user interface of a display device, pertaining to delivery options, of one or more items, associated with the first geographic area; and a physical transmitter to transmit, via the second network connection, the second regional purchasing information web content to the consumer computer, the transmitting causes the consumer computer to display a web page of the vendor server that is integrated with the second regional purchasing information.

2. The computer system of claim 1, wherein:
the at least one portion of the first regional purchasing information web content includes a representation of a first currency and the second regional purchasing information web content includes a representation of a second currency different from the first currency.

3. The computer system of claim 1, wherein:
the first regional purchasing information web content includes a representation of a first parcel delivery service and the second regional purchasing information web content includes a representation of a second parcel delivery service different from the first parcel delivery service.

4. The computer system of claim 1, wherein:
the monitoring component is further configured to detect the geocoded indicator of a geolocation of the consumer computer.

5. The computer system of claim 4, wherein:
the converting component is further configured to convert the at least one portion of the first regional purchasing information web content into content configured for the geolocation.

6. The computer system of claim 5, wherein:
the content configured for the geolocation includes an identifier of a parcel delivery service that services the geolocation.

7. The computer system of claim 5, wherein:
the content configured for the geolocation includes a representation of currency tenderable at the geolocation.

8. The computer system of claim 5, wherein: the content configured for the geolocation includes a representation of a welcome mat.

9. The computer system of claim 8, wherein:
the representation of the welcome mat includes at least one of an identifier of a language, an identifier of a currency, and an indicator of shipping preferences.

10. The computer system of claim 9, wherein:
the indicator of shipping preferences includes an indicator of a preferred destination.

11. The computer system of claim 10, wherein:
the indicator of the preferred destination includes an indicator of at least one of an occupiable structure, a kiosk, and a locker.

12. The computer system of claim 4, wherein:
the monitoring component is further configured to detect at least one action to change the geolocation and the converting component is configured to convert the at least one portion of the first regional purchasing information web content into the second regional purchasing information web converted content responsive to detection of the at least one action.

13. The computer system of claim 1, wherein:
the first regional purchasing information web content includes text formatted as a first currency.

14. The computer system of claim 13, wherein:
the second regional purchasing information web content includes text formatted as a second currency different from the first currency.

15. The system of claim 1, wherein the converting component is further configured to convert the at least one portion of the web content to match a format and style of the web content of the website provider.

16. The computer system of claim 1, wherein:
the monitoring component is further configured to detect executable content in the first regional purchasing information web content and the converting component is further configured to reconfigure the at least one portion of the first regional purchasing information web content to execute at least one process in place of the executable content.

17. The computer system of claim 16, wherein:
the executable content is configured to execute a transaction in a first currency and the consumer computer is configured to execute the transaction in a second currency different from the first currency.

18. The computer system of claim 1, wherein:
the converting component is further configured to remove part of the at least one portion of the first regional purchasing information web content and replace the part with the second regional purchasing information web content.

19. The computer system of claim 18, wherein:
the part includes an identifier of a first parcel delivery service and the second regional purchasing information web content includes an identifier of a second parcel delivery service different from the first parcel delivery service.

20. The computer system of claim 1, wherein: the geocoded indicator comprises at least one of a network address or a country code.

21. The computer system of claim 1, wherein:
the region of the default geocoded indicator comprises a domestic geographic region; and
the region of the geocoded indicator comprises an international geographic region in which the consumer computer is located.

22. The computer system of claim 1, wherein: the converting component that converts the at least one portion of the first regional purchasing information web content further comprises removing one or more other items of content, of the first regional purchasing information web content, determined as being internationally insignificant.

23. The computer system of claim 22, wherein: the one or more other items determined as being internationally insignificant comprises at least one of a regional advertisement, an item of local promotional information, a regional circular, and regional brick and mortar store information.

24. A method of augmenting website provider content, comprising:
establishing, via a first network connection, a first communication with a vendor server corresponding to a website provider, the first network connection being distinct from a previously established consumer computer-to-vendor server network connection;
establishing, via a second network connection, a second communication with a consumer computer, the second network connection being distinct from the previously established consumer computer-to-vendor server network connection;

monitoring, via a monitoring component, a geocoded indicator received from the consumer computer, the geocoded indicator associated with first regional purchasing information web content generated by the vendor server;

comparing, via the monitoring component, the received geocoded indicator to a default geocoded indicator of the vendor server;

determining, via the monitoring component, whether the geocoded indicator is associated with a region different from a region of the default geocoded indicator;

converting, based on the geocoded indicator, at least one portion of the first regional purchasing information web content associated with a first geographic area into second regional purchasing information web content associated with a second geographic area, in response to: (a) determining that the region of the geocoded indicator is different from the region of the default geocoded indicator; and (b) detecting one or more items of predetermined executable content of the first regional purchasing information web content corresponding to shipping functions, presented via a user interface of a display device, pertaining to delivery options, of one or more items, associated with the first geographic area; and transmitting, via the second network connection, the second regional purchasing information web content to the consumer computer, the transmitting causes the consumer computer to display a web page of the website provider that is integrated with the second regional purchasing information according to the web page semantics.

25. The method of augmenting web site provider content according to claim 24, wherein:
the at least one portion of the first regional purchasing information web content includes a representation of a first currency and the converting the at least one portion of the first regional purchasing information web content includes converting the representation of the first currency into a representation of a second currency different from the first currency.

26. The method of augmenting website provider content according to claim 24, wherein:
the first regional purchasing information web content includes a representation of a first parcel delivery service and the converting the at least one portion of the first regional purchasing information web content includes generating a representation of a second parcel delivery service different from the first parcel delivery service.

27. The method of claim 24, further comprising converting the at least one portion of the web content to match a format and style of the web content of the website provider.

28. The method of augmenting website provider content according to claim 24, further comprising:
detecting the geocoded indicator of a geolocation of the consumer computer.

29. The method of augmenting website provider content according to claim 28, further comprising:
converting the at least one portion of the first regional purchasing information web content into content configured for the geolocation.

30. The method of augmenting website provider content according to claim 28, wherein:
the converting the at least one portion of the first regional purchasing information web content includes identifying an identifier of a parcel delivery service that services to the geolocation.

31. The method of augmenting website provider content according to claim 28, wherein:
the converting the at least one portion of the first regional purchasing information web content includes generating a representation of currency tenderable at the geolocation.

32. The method of augmenting website provider content according to claim 24, further comprising:
detecting text formatted as a first currency.

33. The method of augmenting website provider content according to claim 32, wherein:
the converting the at least one portion of the first regional purchasing information web content includes converting the text formatted as the first currency into text formatted as a second currency different from the first currency.

34. The method of claim 24, wherein: the geocoded indicator comprises at least one of a network address or a country code.

35. The method of claim 24, wherein:
the region of the default geocoded indicator comprises a domestic geographic region; and
the region of the geocoded indicator comprises an international geographic region in which the consumer computer is located.

36. The method of claim 24, wherein:
converting the at least one portion of the first regional purchasing information web content further comprises removing one or more other items of content, of the first regional purchasing information web content, determined as being internationally insignificant.

37. The method of claim 36, wherein:
the one or more other items determined as being internationally insignificant comprises at least one of a regional advertisement, an item of local promotional information, a regional circular, and regional brick and mortar store information.

38. The method of claim 24, further comprising:
automatically receiving, in response to the establishing of the second communication, the geocoded indicator received from the consumer computer; and
automatically generating, in response to the automatically receiving of the geocoded indicator, a welcome mat that displays a geographical identifier over the web page of the website provider based on the automatically received geocoded indicator.

39. A non-transitory computer readable medium storing instructions for augmenting website provider content, the instructions being executable by at least one processor of a computer system, the instructions instructing the computer system to:
establish, via a first network connection, a first communication with a vendor server corresponding to a website provider, the first network connection being distinct from a previously established consumer computer-to-vendor server network connection;
establish, via a second network connection, a second communication with a consumer computer, the second network connection being distinct from the previously established consumer computer-to-vendor server network connection;
monitor, via a monitoring component, a geocoded indicator received from the consumer computer, the geocoded indicator associated with first regional purchasing information web content generated by the vendor server for the consumer computer;

compare, via the monitoring component, the received geocoded indicator to a default geocoded indicator;

determine, via the monitoring component, whether the geocoded indicator is associated with a region different from a region of the default geocoded indicator;

convert at least one portion of the first regional purchasing information web content associated with a first geographic area into second regional purchasing information web content associated with a second geographic area, in response to: (a) determining that the region of the geocoded indicator is different from the region of the default geocoded indicator; and (b) detecting one or more items of predetermined executable content of the first regional purchasing information web content corresponding to shipping functions, presented via a user interface of a display device, pertaining to delivery options, of one or more items, associated with the first geographic area; and transmit, via the second network connection, the second regional purchasing information web content to the consumer computer;

access, via the first network connection, presentation semantics of the website provider; and cause, via the second network connection, the second regional purchasing information web content to be displayed to the consumer computer in a manner that conforms to the presentation semantics.

40. The non-transitory computer readable medium of claim 39, wherein:
the geocoded indicator comprises at least one of a network address or a country code.

41. The non-transitory computer readable medium of claim 39, wherein:
the region of the default geocoded indicator comprises a domestic geographic region; and
the region of the geocoded indicator comprises an international geographic region in which the consumer computer is located.

42. The non-transitory computer readable medium of claim 39, wherein:
convert the at least one portion of the first regional purchasing information web content further comprises removing one or more other items of content, of the first regional purchasing information web content, determined as being internationally insignificant.

43. The non-transitory computer readable medium of claim 42, wherein:
the one or more other items determined as being internationally insignificant comprises at least one of a regional advertisement, an item of local promotional information, a regional circular, and regional brick and mortar store information.

* * * * *

UNITED STATES PATENT AND TRADEMARK OFFICE
CERTIFICATE OF CORRECTION

PATENT NO. : 10,296,968 B2
APPLICATION NO. : 13/736659
DATED : May 21, 2019
INVENTOR(S) : Jeffrey Carl Sager Page 1 of 1

It is certified that error appears in the above-identified patent and that said Letters Patent is hereby corrected as shown below:

In the Specification

Column 04, Line 59: After "clarity", please remove "to".
Column 07, Line 48: After "Other", please remove "to".
Column 08, Line 31: After "corporate", please remove "to".
Column 08, Line 64: Please remove "j Query" and replace with --jQuery--.
Column 08, Line 64: Please remove "mentoring monitoring" and replace with --monitoring--.
Column 09, Line 14: After "default", please remove "to".
Column 09, Line 64: After "shipping", please remove "to".
Column 12, Line 66: After "website", please remove "to".
Column 15, Line 14: After "devices", please remove "to".
Column 15, Line 63: After "system", please remove "to".
Column 16, Line 46: After "memory", please remove "to".
Column 20, Line 24: After "to the", please remove "to".
Column 21, Line 07: After "payment", please remove "to".

In the Claims

Column 23, Line 66: Please remove "converted content" and replace with --content--.

Signed and Sealed this
Third Day of September, 2019

Andrei Iancu
*Director of the United States Patent and Trademark Office*